(12) United States Patent
Shimoda et al.

(10) Patent No.: US 11,979,513 B2
(45) Date of Patent: *May 7, 2024

(54) HANDS-FREE APPARATUS, HANDS-FREE SYSTEM, AND DATA TRANSFER METHOD

(71) Applicant: PANASONIC INTELLECTUAL PROPERTY MANAGEMENT CO., LTD., Osaka (JP)

(72) Inventors: Tomoki Shimoda, Kanagawa Ken (JP); Yasuo Miura, Kanagawa Ken (JP); Satoshi Kawamura, Kanagawa Ken (JP); Tomoaki Katada, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,520

(22) Filed: Mar. 23, 2022

(65) Prior Publication Data

US 2022/0311855 A1 Sep. 29, 2022

(30) Foreign Application Priority Data

Mar. 24, 2021 (JP) .................................. 2021-050729
Mar. 29, 2021 (JP) .................................. 2021-056138
Feb. 24, 2022 (JP) .................................. 2022-026673

(51) Int. Cl.
*H04M 1/60* (2006.01)
(52) U.S. Cl.
CPC ................................ *H04M 1/6075* (2013.01)
(58) Field of Classification Search
CPC .......... H04M 1/00; H04M 1/275; H04M 1/60; H04M 1/6041; H04M 1/606;
(Continued)

(56) References Cited

U.S. PATENT DOCUMENTS

| 6,360,267 | B1 * | 3/2002 | Kakiuchi ................ H04L 67/14 709/227 |
| 11,546,456 | B2 * | 1/2023 | Kawamura ....... H04M 1/72421 |
| 2002/0032048 | A1 | 3/2002 | Kitao et al. |
| 2007/0178944 | A1 | 8/2007 | Mitsuru et al. |
| 2010/0062714 | A1 | 3/2010 | Ozaki |
| 2010/0197362 | A1 | 8/2010 | Saitoh et al. |

(Continued)

FOREIGN PATENT DOCUMENTS

| JP | 2002-193046 | 7/2002 |
| JP | 2006-109292 | 4/2006 |

(Continued)

*Primary Examiner* — Angelica Perez
(74) *Attorney, Agent, or Firm* — Greenblum and Bernstein, P.L.C.

(57) ABSTRACT

A hands-free apparatus enables a hands-free call by being wirelessly connected to a mobile phone that stores therein history data including incoming call history data and outgoing call history data, and phonebook data. The hands-free apparatus is configured to: perform control of connecting to the mobile phone by a transfer protocol for transferring the history data and the phonebook data; receive the history data and the phonebook data from the mobile phone by the transfer protocol when the mobile phone is present in a wireless connection area; and display an error and display a reconnection screen for receiving an instruction for reconnection by the transfer protocol with the mobile phone from a user, on a display, when connection by the transfer protocol with the mobile phone is disconnected during reception of at least one of the history data and the phonebook data.

15 Claims, 17 Drawing Sheets

(58) Field of Classification Search
CPC .... H04M 1/6075; H04M 1/64; H04M 1/6083; H04M 1/6091; B60K 2370/563; B60K 2370/58; B60K 2370/589; B60K 2370/5911; H04W 4/48; H04W 4/80
See application file for complete search history.

(56) References Cited

U.S. PATENT DOCUMENTS

| | | | |
|---|---|---|---|
| 2012/0309315 A1* | 12/2012 | Sakata | H04M 1/6091 455/41.2 |
| 2013/0005261 A1* | 1/2013 | Yamanaka | H04L 67/142 455/41.2 |
| 2013/0029604 A1* | 1/2013 | Saito | H04W 76/19 455/41.2 |
| 2013/0122969 A1 | 5/2013 | Saitoh et al. | |
| 2014/0066133 A1* | 3/2014 | Ozaki | H04W 4/80 455/569.2 |
| 2015/0223064 A1 | 8/2015 | Takemura et al. | |
| 2015/0229748 A1 | 8/2015 | Ozaki | |
| 2017/0085692 A1 | 3/2017 | Ozaki | |
| 2018/0255165 A1 | 9/2018 | Ozaki | |
| 2019/0289112 A1 | 9/2019 | Ozaki | |
| 2021/0126998 A1 | 4/2021 | Ozaki | |

FOREIGN PATENT DOCUMENTS

| | | |
|---|---|---|
| JP | 2009-118313 | 5/2009 |
| JP | 2014-053931 | 3/2014 |
| JP | 2014-116958 | 6/2014 |
| WO | 2014/050459 | 4/2014 |

\* cited by examiner

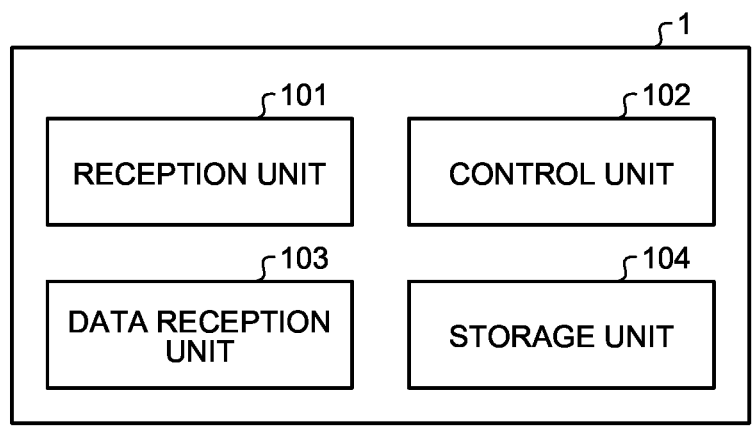
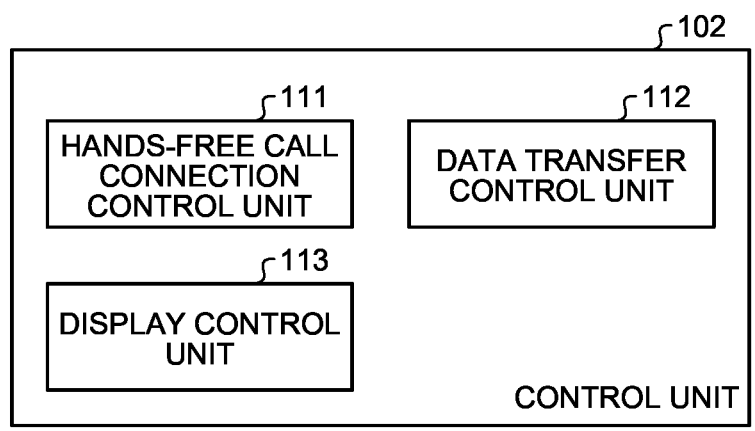

FIG.9

| OUTGOING CALL HISTORY DATA | | |
|---|---|---|
| TARO ABE | 090xxxxxxxx | AUGUST 10 12:15 |
| HANAKO SATO | 090xxxxxxxx | AUGUST 10 12:00 |
| TARO ABE | 090xxxxxxxx | AUGUST 10 11:20 |
| KAZUO TANAKA | 090xxxxxxxx | AUGUST 10 11:10 |
| KAZUO TANAKA | 090xxxxxxxx | AUGUST 10 10:50 |
| JIRO NOMURA | 090xxxxxxxx | AUGUST 10 10:15 |

| INCOMING CALL HISTORY DATA | | |
|---|---|---|
| ICHIRO KATO | 090xxxxxxxx | AUGUST 10 13:00 |
| AIKO HAYASHI | 090xxxxxxxx | AUGUST 10 12:25 |
| ROKURO MORI | 090xxxxxxxx | AUGUST 10 11:45 |
| ICHIRO KATO | 090xxxxxxxx | AUGUST 10 11:15 |
| SHICHIRO YAMADA | 090xxxxxxxx | AUGUST 10 11:10 |
| HACHIRO UEDA | 090xxxxxxxx | AUGUST 10 10:20 |

| MISSED CALL HISTORY DATA | | |
|---|---|---|
| TARO MURAKAMI | 090xxxxxxxx | AUGUST 10 12:28 |
| HANAKO SAITO | 090xxxxxxxx | AUGUST 10 12:24 |
| HANAKO UEDA | 090xxxxxxxx | AUGUST 10 12:06 |
| JIRO OBAYASHI | 090xxxxxxxx | AUGUST 10 11:04 |
| HANAKO SAITO | 090xxxxxxxx | AUGUST 10 10:54 |
| KAZUO OMURA | 090xxxxxxxx | AUGUST 10 10:24 |

| ALL INCOMING AND OUTGOING CALL HISTORY DATA | | |
|---|---|---|
| ICHIRO KATO | 090xxxxxxxx | AUGUST 10 13:00 |
| TARO MURAKAMI | 090xxxxxxxx | AUGUST 10 12:28 |
| AIKO HAYASHI | 090xxxxxxxx | AUGUST 10 12:25 |
| HANAKO SAITO | 090xxxxxxxx | AUGUST 10 12:24 |
| TARO ABE | 090xxxxxxxx | AUGUST 10 12:15 |
| HANAKO UEDA | 090xxxxxxxx | AUGUST 10 12:06 |
| HANAKO SATO | 090xxxxxxxx | AUGUST 10 12:00 |
| ROKURO MORI | 090xxxxxxxx | AUGUST 10 11:45 |
| ICHIRO KATO | 090xxxxxxxx | AUGUST 10 11:15 |
| SHICHIRO YAMADA | 090xxxxxxxx | AUGUST 10 11:10 |

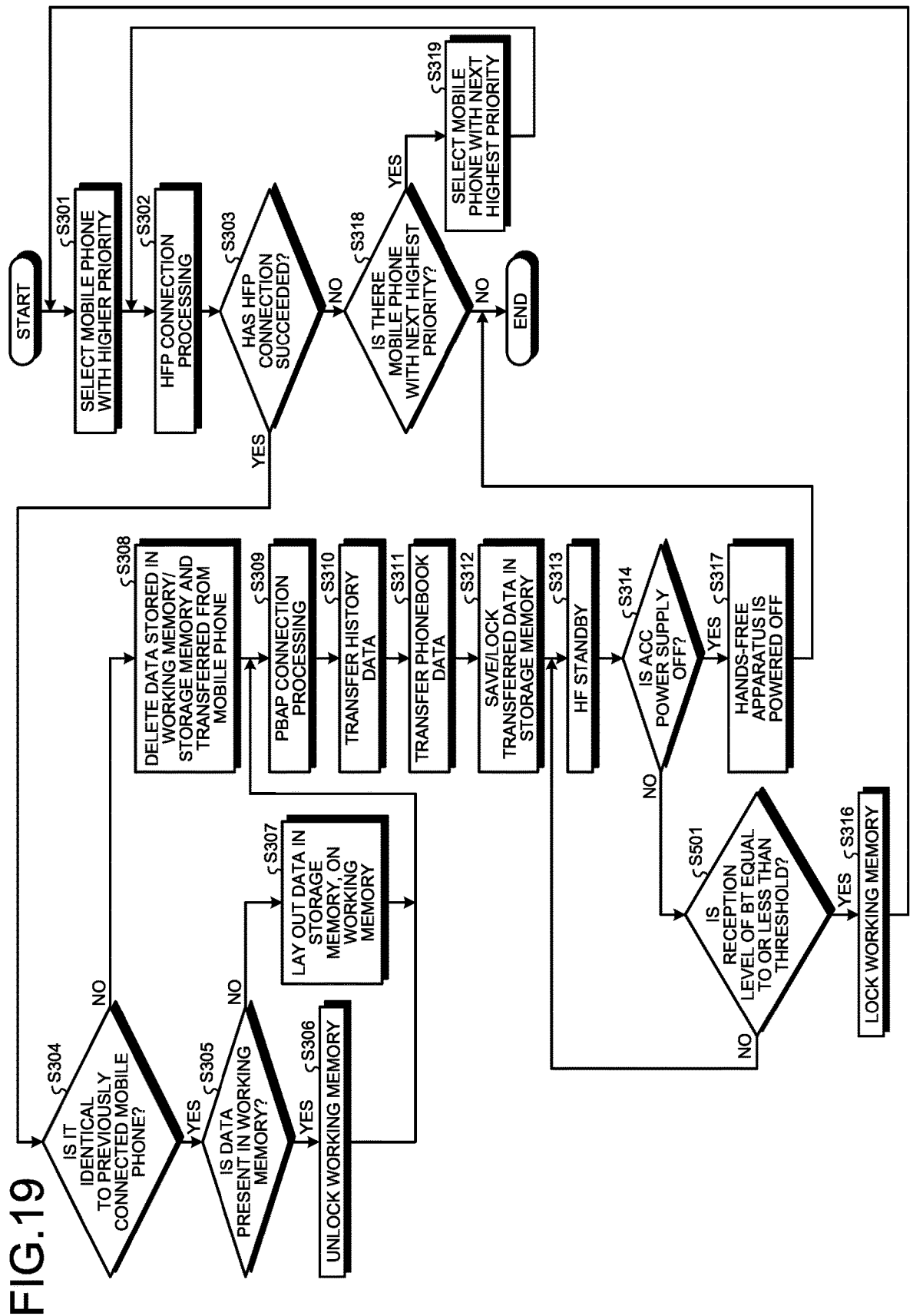

HANDS-FREE APPARATUS, HANDS-FREE SYSTEM, AND DATA TRANSFER METHOD

CROSS-REFERENCE TO RELATED APPLICATIONS

This application is based upon and claims the benefit of priority from Japanese Patent Application No. 2021-050729, filed on Mar. 24, 2021, Japanese Patent Application No. 2021-056138, filed on Mar. 29, 2021, and Japanese Patent Application No. 2022-026673, filed on Feb. 24, 2022, the entire contents of which are incorporated herein by reference.

FIELD

The present disclosure relates to a hands-free apparatus, a hands-free system, and a data transfer method.

BACKGROUND

Hands-free apparatuses installed in vehicles are known. A hands-free apparatus receives incoming and outgoing call operations of a mobile phone instead of the mobile phone, and makes a hands-free call in which a user makes a call without holding the mobile phone. For example, when a user carries a mobile phone and gets in a vehicle and the mobile phone enters a near-field communication service area, a hands-free apparatus establishes a channel with the mobile phone. Then, the hands-free apparatus receives phonebook data representing correspondence between phone numbers and registered names from the mobile phone. This allows the user to select a desired phone number from the phonebook data of the mobile phone and make a call by operating the hands-free apparatus (for example, Japanese Patent Application Laid-open No. 2002-193046). Furthermore, various systems for connecting an in-vehicle device and a mobile device for user convenience have also been proposed (for example, WO 2014/050459, Japanese Patent Application Laid-open No. 2006-109292, and Japanese Patent Application Laid-open No. 2009-118313). Other conventional techniques are described in Japanese Patent Application Laid-open No. 2014-116958 and Japanese Patent Application Laid-open No. 2014-053931.

However, it is desirable to further improve the convenience of hands-free apparatuses.

SUMMARY

A hands-free apparatus according to the present disclosure enables a hands-free call by being wirelessly connected to a mobile phone that stores therein history data and phonebook data in which a registered name is registered corresponding to a phone number. The history data includes incoming call history data representing an incoming call phone number that is a source of an incoming call and outgoing call history data representing an outgoing call phone number that is a destination of an outgoing call. The hands-free apparatus includes a memory and a hardware processor coupled to the memory. The hardware processor being configured to: perform control of connecting to the mobile phone by a transfer protocol for transferring the history data and the phonebook data; receive the history data and the phonebook data from the mobile phone by the transfer protocol when the mobile phone is present in a wireless connection area; and display an error and display a reconnection screen for receiving an instruction for reconnection by the transfer protocol with the mobile phone from a user, on a display, when connection by the transfer protocol with the mobile phone is disconnected during reception of at least one of the history data and the phonebook data.

BRIEF DESCRIPTION OF THE DRAWINGS

FIG. 3 is a diagram illustrating an example of functions provided in the hands-free apparatus according to the first embodiment;

FIG. 4 is a diagram illustrating an example of detailed functions of a control unit of the hands-free apparatus according to the first embodiment;

FIG. 9 is a diagram illustrating an example of first outgoing call history data, incoming call history data, missed call history data, and all incoming and outgoing call history data;

FIG. 19 is a diagram illustrating an example of a flow of a data transfer process according to the fourth embodiment.

DETAILED DESCRIPTION

Hereinafter, embodiments of a hands-free apparatus, a hands-free system, and a data transfer method according to the present disclosure will be described with reference to the drawings.

First Embodiment

Figure 1:
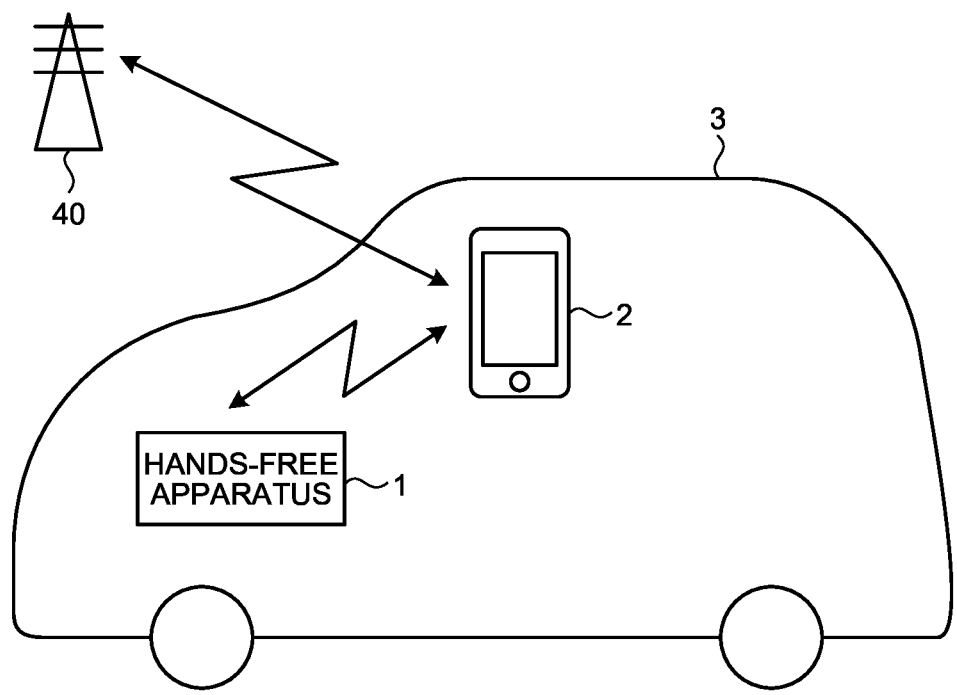
FIG. 1 is a diagram illustrating an example of a usage mode of a hands-free apparatus according to a first embodiment.

FIG. 1 is a diagram illustrating an example of a usage mode of a hands-free apparatus 1 according to the present embodiment. As illustrated in FIG. 1, the hands-free apparatus 1 according to the present embodiment can be installed in a vehicle 3. The hands-free apparatus 1 is communicably connected to a mobile phone 2. The mobile phone 2 wirelessly communicates with a base station 40 via a mobile phone network. The mobile phone 2 is, for example, a smartphone, and has a communication function based on the Bluetooth (registered trademark) system, which is near-field wireless communication means. Note that the mobile phone 2 may be a mobile phone of a type other than the smartphone as long as it has a communication function based on the Bluetooth system.

The hands-free apparatus 1 is connected to the mobile phone network via the mobile phone 2. With this, for example, a driver of the vehicle 3 can make an outgoing call and receive an incoming call by operating the hands-free apparatus 1 even without operating the mobile phone 2. The hands-free apparatus 1 may be implemented as one function of a navigation device installed in the vehicle 3, for example.

Figure 2:
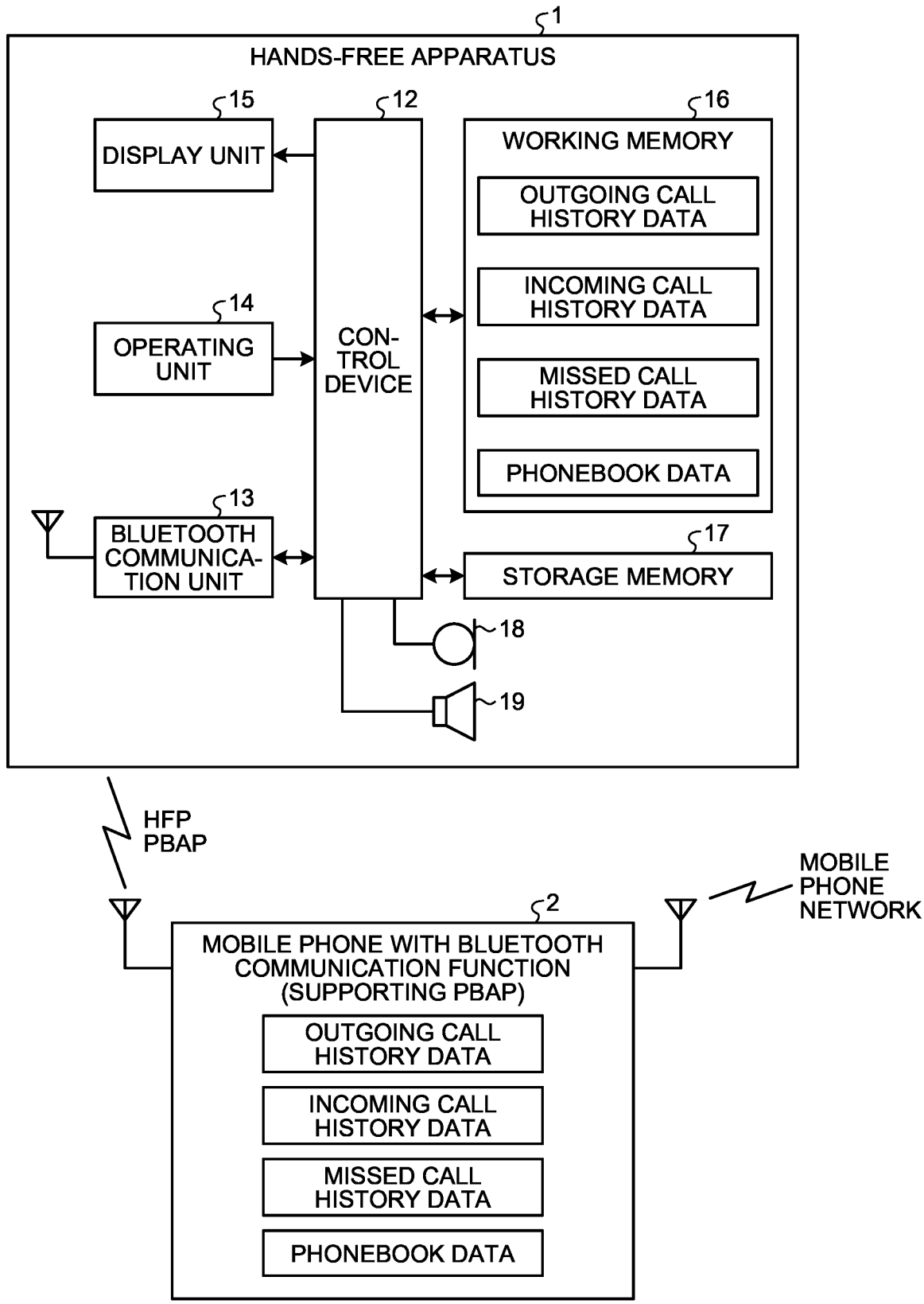
FIG. 2 is a diagram illustrating an example of a hardware configuration of the hands-free apparatus according to the first embodiment.

FIG. 2 is a diagram illustrating an example of a hardware configuration of the hands-free apparatus 1 according to the present embodiment. The hands-free apparatus 1 includes a control device 12, a Bluetooth communication unit 13, an operating unit 14, a display unit 15, a working memory 16, a storage memory 17, a microphone 18, and a speaker 19.

The control device 12 controls an entire operation such as a communication operation and a data management operation of the hands-free apparatus 1. The control device 12 is, for example, a processor such as a central processing unit (CPU).

The Bluetooth communication unit 13 supports a Bluetooth system that is near-field wireless communication means, establishes a wireless channel with the mobile phone 2 present within a Bluetooth wireless communication service area, and performs communication based on a Bluetooth communication standard. In such a case, it is assumed that the mobile phone 2 has a Bluetooth communication function and is present within the Bluetooth wireless communication service area of the hands-free apparatus 1.

The Bluetooth communication unit 13 of the present example supports a well-known hands-free profile (HFP) for making a hands-free call and a phone book access profile (PBAP) for transferring phonebook data and incoming and outgoing call history data. These profiles mean communication protocols defined for individual functions.

As is well known, the mobile phone 2 is configured to be able to establish a mobile phone line with the base station 40 of the mobile phone network to perform outgoing and incoming call processing independently (without HFP connection with the hands-free apparatus 1 that is a hands-free device). In such a case, according to the outgoing call processing, for example, when a user inputs a phone number of an outgoing call destination by operating dial keys ("0" to "9" numeric keys) (not illustrated) and then operates an outgoing call key (not illustrated), the mobile phone 2 can make an outgoing call using the phone number as the outgoing call destination and communicate with a mobile phone of the outgoing call destination.

Furthermore, according to the incoming call processing, when an incoming call signal is received from the base station 40 in response to an outgoing call from another mobile phone of an outgoing call source to the mobile phone 2 as an outgoing call destination, the mobile phone 2 receives a phone number of the mobile phone of the outgoing call source from the base station 40 as an incoming call phone number, and when the user operates an incoming call key (not illustrated), the mobile phone 2 can communicate with the other mobile phone of the outgoing call source in response to the other mobile phone of the outgoing call source.

The mobile phone 2 has a clock unit (not illustrated) that counts date and time, and stores and holds therein a plurality of pieces of outgoing call history data in which correspondence between the outgoing call phone number input from the dial keys in the outgoing call processing and an outgoing call date and time based on the date and time counted by the clock unit is set as one set of data. Furthermore, the mobile phone 2 stores and holds therein a plurality of pieces of incoming call history data in which correspondence between the incoming call phone number received from the base station 40 in the incoming call processing and an incoming call date and time based on the date and time counted by the clock unit is set as one set of data.

Furthermore, the mobile phone 2 stores and holds therein a plurality of pieces of missed call history data in which correspondence between an incoming call phone number received from the base station 40 when making no response to an incoming call and the incoming call date and time based on the date and time counted by the clock unit is set as one set of data. Moreover, the mobile phone 2 holds therein a plurality of pieces of phonebook data in which correspondence between phone numbers and registered names is set as respective sets of data. The phonebook data includes, for example, about 500 phone numbers and registered names, which are associated with each other among phone numbers and registered names input by a user and stored in a nonvolatile memory (not illustrated).

When the mobile phone 2 has the phonebook data, outgoing call history data and incoming call history data include the registered names. Specifically, when the incoming call processing has been performed, the mobile phone 2 checks whether the incoming call phone number received from the base station 40 is a phone number registered in the phonebook data and whether a registered name associated with this phone number has been registered in the phonebook data. The mobile phone 2 registers the phone number, the incoming call date and time, and the registered name, if registered, in the incoming call history data as one set of data in association with one another. Even when making no response to an incoming call, the mobile phone 2 registers the phone number, the incoming call date and time, and the registered name thereof in missed call history data as one set of data in association with one another, by the same process. When the outgoing call processing has been performed, the mobile phone 2 checks whether the outgoing call phone number is a phone number registered in the phonebook data. The mobile phone 2 registers the outgoing date and time and the outgoing call phone number, if registered, in the outgoing call history data as one set of data in association with one another.

Then, by reading the phonebook data and selecting one phone number to make a call, the user can definitely make a call with a simple operation even without inputting all numeric keys corresponding to the numbers constituting the phone number one by one. The mobile phone 2 can store therein, for example, the latest 20 pieces of outgoing call history data, the latest 20 pieces of incoming call history data, and the latest 20 pieces of missed call history data, and updates the outgoing call history data, the incoming call history data, and the missed call history data by automatically erasing the oldest data each time the outgoing call processing, the incoming call processing, or the missed call is performed. The mobile phone 2 supports the well-known HFP for making a hands-free call and the PBAP for transferring the phonebook data and the incoming and outgoing call history data.

When the mobile phone 2 supports the PBAP that defines automatic transfer of the incoming and outgoing call history data, the mobile phone 2 connects the PBAP immediately after establishing a channel with the Bluetooth communication unit 13, automatically transfers phonebook data stored therein at that time, and further automatically transfers outgoing call history data, incoming call history data, and missed call history data stored therein at that time. With this, when the hands-free apparatus 1 is present within the Bluetooth communication service area, the mobile phone 2 automatically transfers, to the hands-free apparatus 1, maximum 20 pieces of outgoing call history data stored therein by independently performing outgoing call processing in the past, maximum 20 pieces of incoming call history data stored therein by independently performing incoming call processing in the past, and maximum 20 pieces of missed call history data stored therein by independently performing missed call processing in the past.

In the present embodiment, when the outgoing call history data, the incoming call history data, and the missed call history data are collectively referred to, they may be simply referred to as history data. The history data includes at least the outgoing call history data and the incoming call history data. The history data may be in a form composed of the outgoing call history data and the incoming call history data, or may be in a form composed of the outgoing call history data, the incoming call history data, and the missed call history data.

The operating unit 14 is operating means to be operated by a user, is composed of, for example, touch keys formed on the display unit 15, detects a user's operation, and outputs an operating signal indicating the content of the operation to the control device 12. The display unit 15 is display means, and when a display signal is input from the control device 12, the display unit 15 displays a display screen based on the input display signal, and displays, for example, a display screen, in which the dial keys corresponding to "0" to "9" are arranged, as a display screen on which the user inputs a phone number.

The working memory 16 is composed of a volatile memory. The working memory 16 stores therein the outgoing call history data, the incoming call history data, the missed call history data, and the phonebook data automatically transferred from the mobile phone 2 without any operation of the user. In such a case, the working memory 16 can store therein, for example, five pieces of outgoing call history data, five pieces of incoming call history data, and five pieces of missed call history data. The working memory 16 is, for example, a random-access memory (RAM) or the like.

The storage memory 17 is composed of a nonvolatile memory and stores therein various data. The storage memory 17 is, for example, a read-only memory (ROM). Furthermore, the storage memory 17 may be a writable storage medium such as a hard disk drive (HDD) or a flash memory.

In such a case, when the user makes a display request for outgoing call history data with the operating unit 14, the control device 12 causes the display unit 15 to display the outgoing call history data stored in the working memory 16, and when the user makes a display request for incoming call history data with the operating unit 14, the control device 12 causes the display unit 15 to display the incoming call history data stored in the working memory 16. When the user makes a display request for phonebook data with the operating unit 14, the control device 12 causes the display unit 15 to display the phonebook data stored in the working memory 16. In the hands-free apparatus 1 according to the present embodiment, for example, it is assumed that there are five pieces of outgoing call history data and five pieces of incoming call history data stored in the working memory 16, and the maximum number of pieces of data displayed on the display unit 15 is also five for each. The number of these pieces of data stored in the working memory 16 is an example, and is not limited to the above example.

The microphone 18 is voice input means for inputting voice and inputs a voice uttered by the user when a hands-free call using the mobile phone 2 is made, and the speaker 19 is voice output means and outputs received voice of a call counterpart when a hands-free call using the mobile phone 2 is made. That is, when a Bluetooth channel is established between the Bluetooth communication unit 13 and the mobile phone 2 to connect for HFP wireless communication, the control device 12 causes the Bluetooth communication unit 13 to transmit voice input by the microphone 18 to the mobile phone 2 so as to be transmitted from the mobile phone 2 to the mobile phone network, and causes the Bluetooth communication unit 13 to receive voice, which is received by the mobile phone 2 from the mobile phone network, from the mobile phone 2 so as to be output from the speaker 19.

In addition to the illustrated functional blocks, the hands-free apparatus 1 may also include functional blocks required for a navigation operation, such as a GPS device as a current position detector that detects a current position of a host vehicle, a route search unit that searches for a route from the current position to a destination, a map data reading unit that reads map data from a recording medium recording thereon the map data, a VICS (registered trademark) information reception unit that receives VICS information distributed from a VICS center, and a voice recognition unit that voice-recognizes voice uttered by the user. In such a case, the hands-free apparatus 1 may extract GPS date and time information from GPS wireless signals received by the GPS device from GPS satellites to acquire date and time, and use the acquired date and time as outgoing call date and time or incoming call date and time.

The hands-free apparatus 1 is configured to start and stop in conjunction with on and off of an ACC switch (switch that turns on and off the supply of power to vehicle devices). When the ACC switch is switched from on to off in response to a user's operation, for example, the supply of power to the hands-free apparatus 1 is stopped, so that the power of the hands-free apparatus is switched to off. In such a case, various data stored in the storage memory 17 immediately before are not erased (are stored and held therein), but the outgoing call history data, the incoming call history data, the missed call history data, and the phonebook data stored in the working memory 16 immediately before are configured to be erased.

Next, details of the functions of the hands-free apparatus 1 according to the present embodiment will be described.

FIG. 3 is a diagram illustrating an example of the functions provided in the hands-free apparatus 1 according to the present embodiment. The functions of the hands-free apparatus 1 are not limited to the example of FIG. 3, and the hands-free apparatus 1 may have other functions. In the example of FIG. 3, the hands-free apparatus 1 according to the present embodiment includes a reception unit 101, a control unit 102, a data reception unit 103, and a storage unit 104.

In the present embodiment, respective functions of the reception unit 101, the control unit 102, and the data reception unit 103 are implemented by the control device 12 reading computer programs from the storage memory 17 and executing the computer programs. However, the present disclosure is not limited thereto and, for example, some or all of the functions of the reception unit 101, the control unit 102, and the data reception unit 103 may be implemented by a dedicated hardware circuit. The storage unit 104 is implemented by, for example, the storage memory 17.

The reception unit 101 receives various operations from the user. For example, the reception unit 101 receives input according to user's operations via the operating unit 14. More specifically, the reception unit 101 receives an instruction operation (for example, an operation of pressing an icon) for various images displayed on the display unit 15.

The control unit 102 performs various types of control related to a hands-free function. In such an example, the control unit 102 has a function of connecting to the mobile phone 2 so that a hands-free call can be made, a function of performing data transfer-related control using a transfer protocol in order to transfer the incoming call history data, the outgoing call history data, and the phonebook data stored in the mobile phone 2 when the mobile phone 2 is present in a wireless connection area, and the like. In an embodiment, the transfer protocol is the PBAP.

When PBAP connection with the mobile phone 2 is interrupted during the reception of at least one of the history data and the phonebook data, the control unit 102 displays an error and causes the display unit 15 to display a reconnection screen for receiving an instruction for PBAP reconnection with the mobile phone 2 from the user. Then, when the reconnection instruction is received from the user via the reconnection screen, the control unit 102 performs PBAP reconnection and receives the history data and the phonebook data. Furthermore, when an interruption instruction is received from the user via the reconnection screen, the control unit 102 interrupts the reception of the history data and the phonebook data.

Furthermore, when prohibition or restriction of the transfer of the history data and the phonebook data is set by, for example, a security setting function of the mobile phone 2, the control unit 102 causes the display unit 15 to display information indicating that the transfer of the history data and the phonebook data is not possible. In such a case, the data reception unit 103 does not receive the history data and the phonebook data from the mobile phone 2 by the PBAP even though the mobile phone 2 is present in the wireless connection area. Furthermore, when the prohibition or restriction of the transfer of the history data is set by, for example, the security setting function of the mobile phone 2, the control unit 102 causes the display unit 15 to display information indicating that the transfer of the history data is not possible. In such a case, the data reception unit 103 does not receive the history data from the mobile phone 2 by the PBAP even though the mobile phone 2 is present in the wireless connection area. Furthermore, when the prohibition or restriction of the transfer of the phonebook data is set by, for example, the security setting function of the mobile phone 2, the control unit 102 causes the display unit 15 to display information indicating that the transfer of the phonebook data is not possible. In such a case, the data reception unit 103 does not receive the phonebook data from the mobile phone 2 by the PBAP even though the mobile phone 2 is present in the wireless connection area.

Furthermore, when the history data stored in the mobile phone 2 does not include all incoming and outgoing call history data in which an incoming call phone number, an outgoing call phone number, and a missed call phone number are integrated, the control unit 102 may generate the all incoming and outgoing call history data based on the incoming call phone number included in the received incoming call history data, the outgoing call phone number included in the received outgoing call phone number, and the missed call phone number included in the received missed call history data. In such a case, for example, the control unit 102 may generate the all incoming and outgoing call history data in which the incoming call phone number included in the received incoming call history data, the outgoing call phone number included in the received outgoing call phone number, and the received missed call history data are sorted by date and time information. Furthermore, in such a case, for example, the control unit 102 may generate the all incoming and outgoing call history data in which the incoming call phone number included in the received incoming call history data, the outgoing call phone number included in the received outgoing call phone number, and the received missed call history data are sorted according to the order in which they are received.

FIG. 4 is a diagram illustrating an example of detailed functions of the control unit 102. As illustrated in FIG. 4, the control unit 102 includes a hands-free call connection control unit 111, a data transfer control unit 112, and a display control unit 113. The functions of the control unit 102 are not limited thereto, and the control unit 102 may further have other functions for implementing the hands-free function.

The hands-free call connection control unit 111 is HFP-connected to the mobile phone 2 so that a hands-free call can be made. More specifically, the hands-free call connection control unit 111 is connected to the mobile phone 2 by controlling the Bluetooth communication unit 13 so that a hands-free call can be made.

The data transfer control unit 112 controls data transfer using a transfer protocol (PBAP in the embodiment). The data transfer control unit 112 may also have a function of generating all incoming and outgoing call history data in which the outgoing call history data, the incoming call history data, and the missed call history data transferred from the mobile phone 2 are collectively displayed in the latest time order. However, the present disclosure is not limited thereto, and, for example, the control unit 102 may individually have a function of generating all incoming and outgoing call history data, separately from the data transfer control unit 112. The display control unit 113 controls the display unit 15 to display various screens. For example, the display control unit 113 controls the display unit 15 to display the reconnection screen, messages, and the like.

In the present embodiment, various functions of the hands-free apparatus 1 are implemented by one apparatus; however, the present disclosure is not limited thereto and, for example, various functions of the hands-free apparatus 1 may be distributed into a plurality of apparatuses. That is, various functions of the hands-free apparatus 1 may be implemented by a system including the apparatuses (hands-free system).

Next, operations of the hands-free apparatus 1 will be described.

The present embodiment will be described on the premise that the mobile phone 2 already holds (stores) therein 20 pieces (maximum storable number) of outgoing call history data, 20 pieces (maximum storable number) of incoming call history data, and 20 pieces (maximum storable number) of missed call history data, and in such a state, a user carrying the mobile phone 2 approaches the vehicle 3, gets in the vehicle 3, and turns on the ACC switch to bring the mobile phone 2 into the Bluetooth communication service area of the hands-free apparatus 1.

The user has pre-registered the mobile phone 2, which is a Bluetooth communication partner, in the hands-free apparatus 1. For example, the user inputs a 4-digit password for each mobile phone 2 to the hands-free apparatus 1 at the time of initial communication setup. The hands-free apparatus 1 and the mobile phone 2 generate a link key that is used to connect to each other and hold the link key. Then, the hands-free apparatus 1 selects a mobile phone 2 to be communicably connected by authenticating the link key at the time of initial connection. That is, neither HFP communication connection nor PBAP communication connection is performed between the hands-free apparatus 1 and an unregistered mobile phone 2. Basically, the mobile phone 2 of an owner of the vehicle 3 is pre-registered, and Bluetooth communication is performed between the mobile phone 2 and the hands-free apparatus 1. The aforementioned method of pre-registering the mobile phone 2 to be communicated with the hands-free apparatus 1 is an example and the present disclosure is not limited thereto.

In the present example, it is assumed that a plurality of mobile phones 2 to be communicably connected have been registered in the hands-free apparatus 1. Furthermore, for example, a user sets priorities for the mobile phones 2 in advance by operating the operating unit 14, and the working memory 16 or the storage memory 17 stores therein the priorities. For example, since a driver may own a plurality of mobile phones 2, it is assumed that the mobile phones 2 can be registered in the hands-free apparatus 1 in this way.

The premise of the present example is that the Bluetooth communication unit 13 of the hands-free apparatus 1 supports both protocols for HFP wireless communication and PBAP wireless communication and can simultaneously connect these two profiles (multi-profile connection). However, this simultaneous connection process is not intentionally performed. There are three main reasons for this.

(1) The mobile phone 2 as a communication partner supports the HFP wireless communication and the PBAP wireless communication, similarly to the hands-free apparatus 1, but may not support the simultaneous connection.

(2) The mobile phone 2 as a communication partner may support the HFP wireless communication and the PBAP wireless communication and may also support the simultaneous connection, but software processing of the Bluetooth communication unit 13 of the hands-free apparatus 1 may be complicated in order to maintain the simultaneous connection, and communication connection may be unstable.

(3) Since the mobile phone 2 is manufactured by many manufacturers around the world, the hands-free apparatus 1 is required to connect to all mobile phones 2 that support the HFP wireless communication and the PBAP wireless communication.

Due to the above reasons, the hands-free apparatus 1 of the present example makes a serial connection, in which the HFP wireless communication and the PBAP wireless communication are time-divided, as a more reliable processing procedure for the HFP wireless communication and the PBAP wireless communication in order to eliminate the simultaneous connection between the HFP wireless communication and the PBAP wireless communication as much as possible.

First Example

Figure 5:
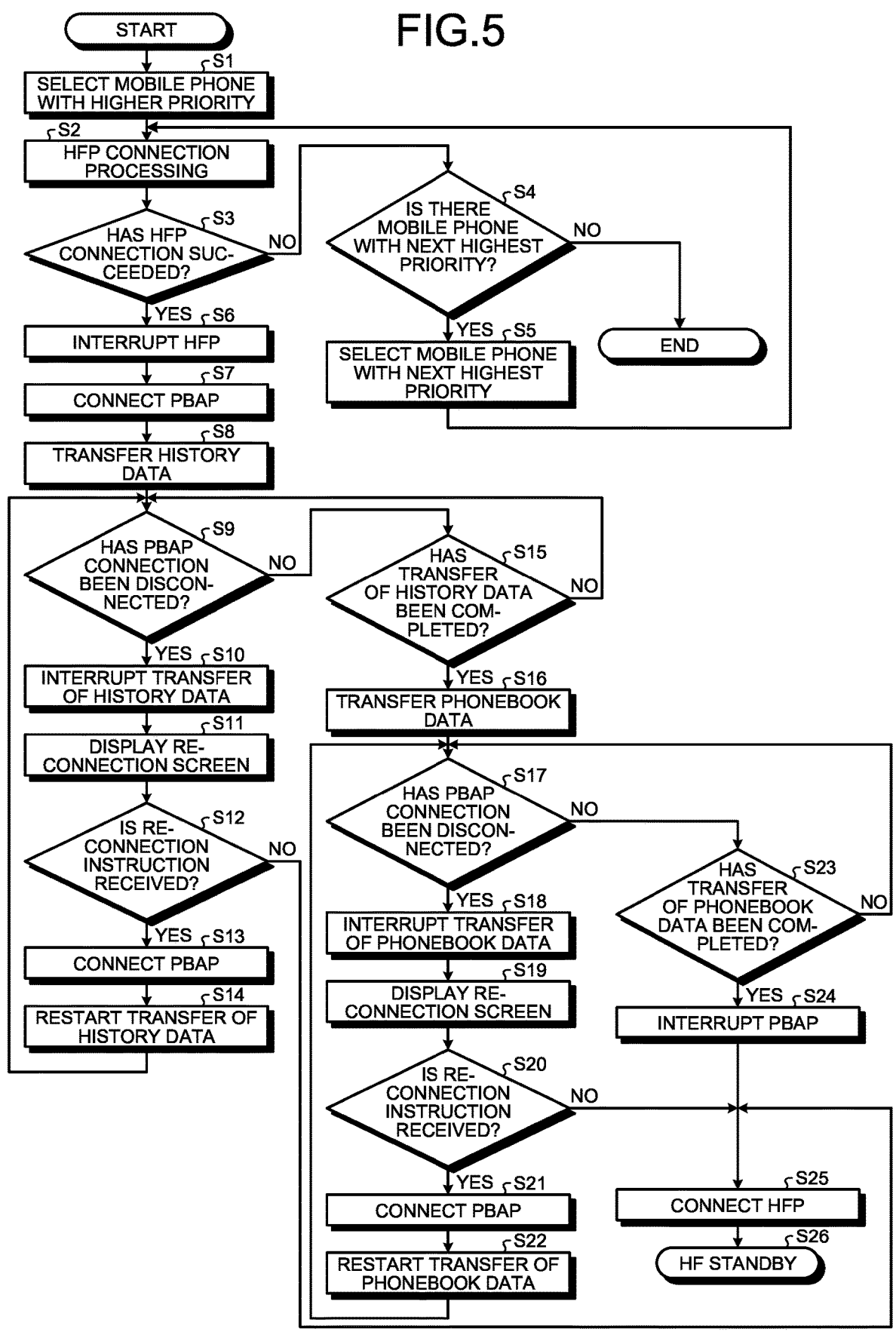
FIG. 5 is a diagram illustrating a first example of a flow of a data transfer process according to the first embodiment.

FIG. 5 is a diagram illustrating a first example of a flow of a data transfer process according to the embodiment. The hands-free apparatus 1 receives, for example, the outgoing call history data, the incoming call history data, the missed call history data, and the phonebook data from the mobile phone 2 in the flow illustrated in FIG. 5.

First, the control unit 102 selects a mobile phone 2 with a higher priority as a communication connection target in the HFP wireless communication (S1). In the present example, HFP initial communication is first automatically attempted to start connection without performing PBAP communication connection first.

Next, the control unit 102 performs a process of automatically connecting the HFP initial communication to the selected mobile phone 2 (S2). Furthermore, the control unit 102 determines whether the HFP wireless communication connection has succeeded (S3).

When it is determined that the HFP wireless communication connection has not succeeded (has failed) ("No" at S3), the control unit 102 determines whether a mobile phone 2 with the next highest priority exists (S4).

When it is determined that the mobile phone 2 with the next highest priority exists ("Yes" at S4), the control unit 102 selects the mobile phone 2 with the next highest priority as a wireless communication connection target (S5), returns to S2, and repeats the process. When it is determined that the mobile phone 2 with the next highest priority does not exist ("No" at S4), the control unit 102 ends the process of the flowchart.

When it is determined that the HFP wireless communication connection has succeeded ("Yes" at S3), the control unit 102 automatically interrupts the connected HFP wireless communication (S6).

Next, the control unit 102 automatically connects PBAP wireless communication to the mobile phone 2 that has succeeded in the HFP wireless communication connection (S7).

Next, the control unit 102 transmits a history data transfer request to the mobile phone 2 so as to start a transfer process of history data (S8). Upon receiving the history data transfer request, the mobile phone 2 transfers the history data to the hands-free apparatus 1 by PBAP Bluetooth communication. The control unit 102 stores the history data transferred (downloaded) from the mobile phone 2 in the working memory 16 or the storage memory 17.

The control unit 102 determines whether the PBAP connection has been disconnected during the transfer of the history data (S9). When it is determined that the PBAP connection has been disconnected ("Yes" at S9), the control unit 102 interrupts the transfer of the history data (S10). Then, the control unit 102 displays an error and controls the display unit 15 to display a reconnection screen for receiving input of an instruction for PBAP reconnection (S11). For example, on the reconnection screen, an icon, a button, or the like for receiving the input of the reconnection instruction may be displayed. When the icon or the like is pressed and the input of the reconnection instruction is received ("Yes" at S12), the control device 12 reconnects the PBAP wireless communication with the mobile phone 2 (S13). Then, the control device 12 restarts the transfer of the history data (S14). The following process is the same as S9 and below. The form of restarting the transfer of the history data in S14 is arbitrary. For example, the transfer of the history data may be restarted from the middle of the interruption, or the transfer of the history data may be performed from the beginning again.

On the other hand, when the input of the reconnection instruction is not received ("No" at S12), the control unit 102 proceeds to S25. For example, on the reconnection screen, an icon, a button, or the like for receiving an instruction of interrupting the reception of the history data may be displayed. In such a case, when the icon, the button, or the like for receiving the instruction of interrupting the reception of the history data is pressed, the control unit 102 proceeds to S25.

In this way, when the PBAP connection is disconnected during the transfer of the history data, the control unit 102 displays an error and displays a reconnection screen for receiving input of an instruction for PBAP reconnection. Then, when the input of the instruction for PBAP reconnection is received via the reconnection screen, the control unit 102 performs the PBAP reconnection and receives the history data. According to such a configuration, the control unit 102 can inform a user of the interruption of the PBAP connection (occurrence of an error) during the transfer of the history data, and allow the user to select whether to perform the PBAP reconnection. This enables the hands-free apparatus 1 to improve the convenience of users.

When it is determined at S9 that the PBAP connection has not been disconnected ("No" at S9), the control unit 102 determines whether the transfer of the history data has been completed (S15). When it is determined that the transfer of the history data has been completed ("Yes" at S15), the control unit 102 transmits a phonebook data transfer request to the mobile phone 2 so as to start a transfer process of phonebook data (S16).

Upon receiving the phonebook data transfer request, the mobile phone 2 transfers the phonebook data to the hands-free apparatus 1 by the PBAP Bluetooth communication. The control unit 102 stores the phonebook data transferred from the mobile phone 2 in the working memory 16 or the storage memory 17.

Next, the control unit 102 determines whether the PBAP connection has been disconnected during the transfer of the phonebook data (S17). When it is determined that the PBAP connection has been disconnected ("Yes" at S17), the control unit 102 interrupts the transfer of the phonebook data (S18). Then, the control unit 102 displays an error and controls the display unit 15 to display a reconnection screen for receiving input of an instruction for PBAP reconnection (S19). When the input of the reconnection instruction is received via the reconnection screen ("Yes" at S20), the control unit 102 reconnects the PBAP wireless communication with the mobile phone 2 (S21). Then, the control unit 102 restarts the transfer of the phonebook data (S22). The following process is the same as S17 and below.

On the other hand, when the input of the reconnection instruction is not received ("No" at S20), the control unit 102 proceeds to S25. For example, on the reconnection screen, an icon, a button, or the like for receiving an instruction of interrupting the reception of the phonebook data may be displayed. In such a case, when the icon, the button, or the like for receiving the instruction of interrupting the reception of the phonebook data is pressed, the control unit 102 proceeds to S25.

When it is determined at S17 that the PBAP connection has not been disconnected ("No" at S17), the control unit 102 determines whether the transfer of the phonebook data has been completed (S23). When the transfer process of the phonebook data has been completed ("Yes" at S23), the control unit 102 interrupts the PBAP wireless communication with the mobile phone 2 (S24).

In this way, when the PBAP connection is disconnected during the transfer of the phonebook data, the control unit 102 displays an error and displays a reconnection screen for receiving input of an instruction for PBAP reconnection. Then, when the input of the instruction for PBAP reconnection is received via the reconnection screen, the control unit 102 performs the PBAP reconnection and receives the phonebook data. According to such a configuration, the control unit 102 can inform the user of the interruption of the PBAP connection (occurrence of an error) during the transfer of the phonebook data, and allow the user to select whether to perform the PBAP reconnection. This enables the hands-free apparatus 1 to improve the convenience of users.

Next, the control unit 102 automatically connects the HFP wireless communication to the mobile phone 2 again (S25).

Then, when the HFP wireless communication with the mobile phone 2 is established, the display control unit 102 proceeds to a hands-free (HF) standby process (S26). When the process proceeds to S26, the control unit 102 ends the process of the present flow. During the execution of the hands-free standby process, the hands-free apparatus 1 is enabled to make an outgoing call or receive an incoming call via the mobile phone 2. The hands-free standby process continues until the hands-free apparatus 1 is powered off or the HFP wireless communication with the mobile phone 2 is canceled. Examples of the case where the HFP wireless communication with the mobile phone 2 is canceled include a case where a user performs an operation of disconnecting the hands-free apparatus 1 or the mobile phone 2, a case where the mobile phone 2 has left the Bluetooth communication service area of the hands-free apparatus 1, and the like.

By performing such a process, the hands-free apparatus 1 can automatically switch wireless communication serially in the order of HFP, PBAP, and HFP. This makes it possible for the hands-free apparatus 1 to reliably and stably perform a communication process for mobile phones 2 of many manufacturers that support HFP wireless communication and PBAP wireless communication. Furthermore, such a method enables the hands-free apparatus 1 to reduce the complexity of software processing.

In the present embodiment, control is performed to display a reconnection screen when the PBAP connection is disconnected during the transfer of both the history data and the phonebook data. However, the present disclosure is not limited thereto and, for example, control may be performed for only one of the history data and the phonebook data.

Second Example

Figure 6:
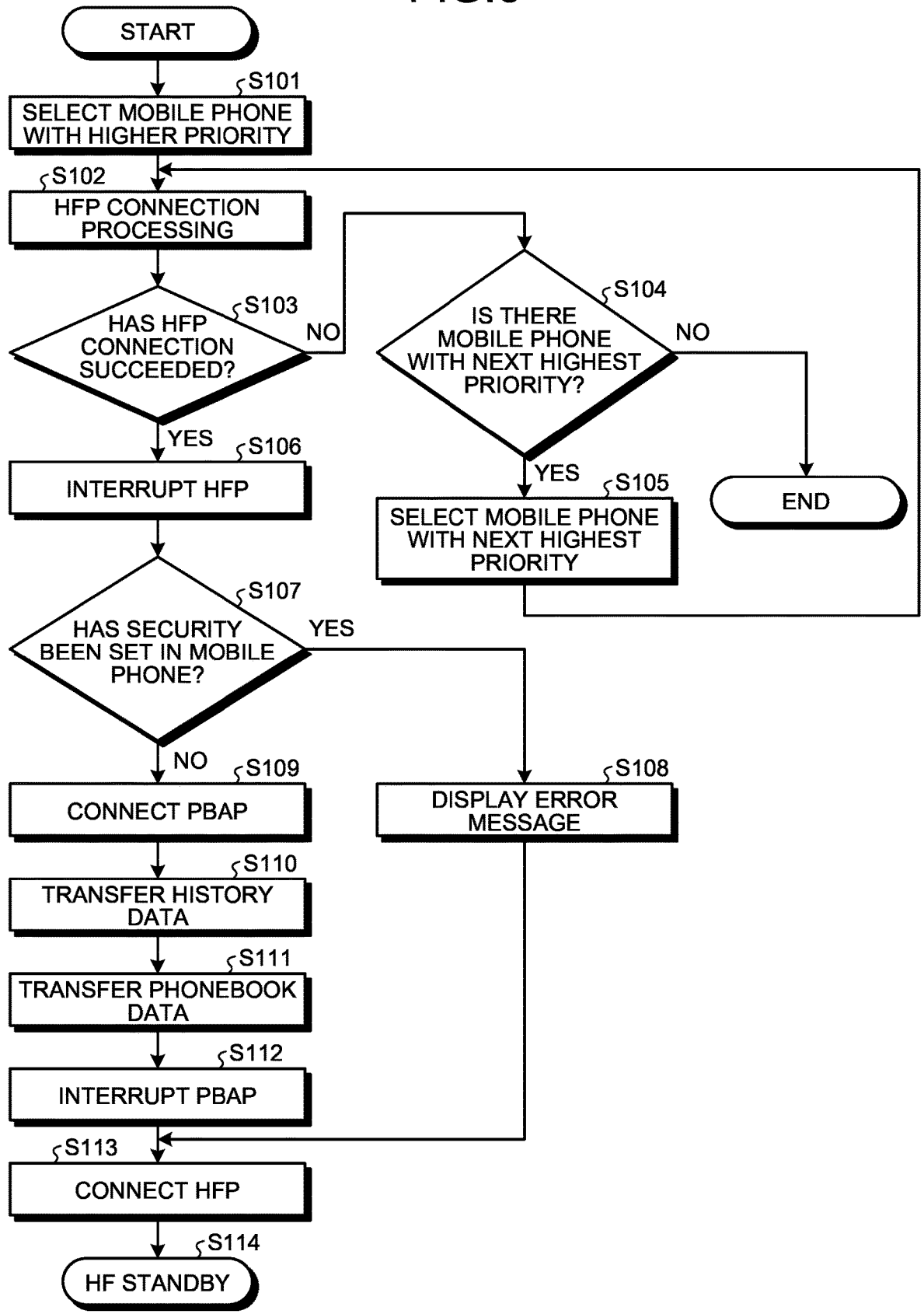
FIG. 6 is a diagram illustrating a second example of a flow of a data transfer process according to the first embodiment.

FIG. 6 is a diagram illustrating a second example of a flow of a data transfer process according to the embodiment. The hands-free apparatus 1 may receive, for example, the outgoing call history data, the incoming call history data, the missed call history data, and the phonebook data from the mobile phone 2 in the flow illustrated in FIG. 6.

First, the control unit 102 performs processes of S101 to S106. Since the processes of S101 to S106 are the same as those of S1 to S6 in FIG. 5, description thereof will be omitted.

Next, the control unit 102 determines whether a security function of prohibiting or restricting the transfer of the history data and the phonebook data has been set in the mobile phone 2 (S107). In such an example, the control unit 102 determines whether the security function of prohibiting or restricting the transfer of the history data and the phonebook data has been set in the mobile phone 2. Examples of the security function of prohibiting or restricting the transfer of the history data and the phonebook data in the mobile phone 2 include setting that prohibits access to a memory of the mobile phone 2, and the like.

When the determination result of S107 is affirmative ("Yes" at S107), the control unit 102 controls the display unit 15 to display information indicating that transfer is not possible because the mobile phone 2 is set to prohibit or restrict the transfer of the history data and the phonebook data, for example, a message indicating an error (S108). This message may include, for example, more detailed reasons. When the process of S108 ends, the control unit 102 proceeds to S113.

When the determination result of S107 is negative ("No" at S107), the control unit 102 automatically connects PBAP wireless communication to a mobile phone 2 that has succeeded in the HFP wireless communication connection (S109).

Next, the control unit 102 transmits a history data transfer request to the mobile phone 2 so as to start a transfer process of history data (S110). Upon receiving the history data transfer request, the mobile phone 2 transfers the history data to the hands-free apparatus 1 by PBAP Bluetooth communication. The control unit 102 stores the history data transferred (downloaded) from the mobile phone 2 in the working memory 16 or the storage memory 17.

When it is determined that the transfer of the history data has been completed, the control unit 102 transmits a phonebook data transfer request to the mobile phone 2 so as to start a transfer process of phonebook data (S111). Upon receiving the phonebook data transfer request, the mobile phone 2 transfers the phonebook data to the hands-free apparatus 1 by the PBAP Bluetooth communication. The control unit 102 stores the phonebook data transferred from the mobile phone 2 in the working memory 16 or the storage memory 17.

When the transfer of the phonebook data has been completed, the control unit 102 interrupts the PBAP wireless communication with the mobile phone 2 (S112). When the PBAP wireless communication is interrupted, the control unit 102 proceeds to S113.

At S113, the control unit 102 automatically connects the HFP wireless communication to the mobile phone 2 again. Then, when the HFP wireless communication with the mobile phone 2 is established, the display control unit 102 proceeds to a hands-free (HF) standby process (S114). When the process proceeds to S26, the control unit 102 ends the process of the present flow.

By performing such a process, the hands-free apparatus 1 can automatically switch wireless communication serially in the order of HFP, PBAP, and HFP. This makes it possible for the hands-free apparatus 1 to reliably and stably perform a communication process for mobile phones 2 of many manufacturers that support HFP wireless communication and PBAP wireless communication. Furthermore, such a method enables the hands-free apparatus 1 to reduce the complexity of software processing.

Moreover, when the mobile phone 2 is set to prohibit or restrict the transfer of the history data and the phonebook data, the hands-free apparatus 1 causes the display unit 15 to display information indicating that the transfer of the history data and the phonebook data is not possible. In such a case, the hands-free apparatus 1 receives no history data and phonebook data from the mobile phone 2. This enables the hands-free apparatus 1 to inform a user of the reason why the history data or the phonebook data is not downloadable. As a consequence, the hands-free apparatus 1 can improve the convenience of users. Furthermore, the hands-free apparatus 1 can make a user confirm that the history data or the phonebook data in the mobile phone 2 is not unintentionally transferred to the hands-free apparatus 1, which makes it possible to reassure the user.

The processes of S107 and S108 illustrated in FIG. 6 can also be incorporated into the process of the first example illustrated in FIG. 5. In such a case, the control unit 102 performs the process of S107 after S6. When the determination result of S107 is negative ("No" at S107), the control unit 102 proceeds to S7. Moreover, the control unit 102 proceeds to S25 after the process of S108.

Third Example

Figure 7:
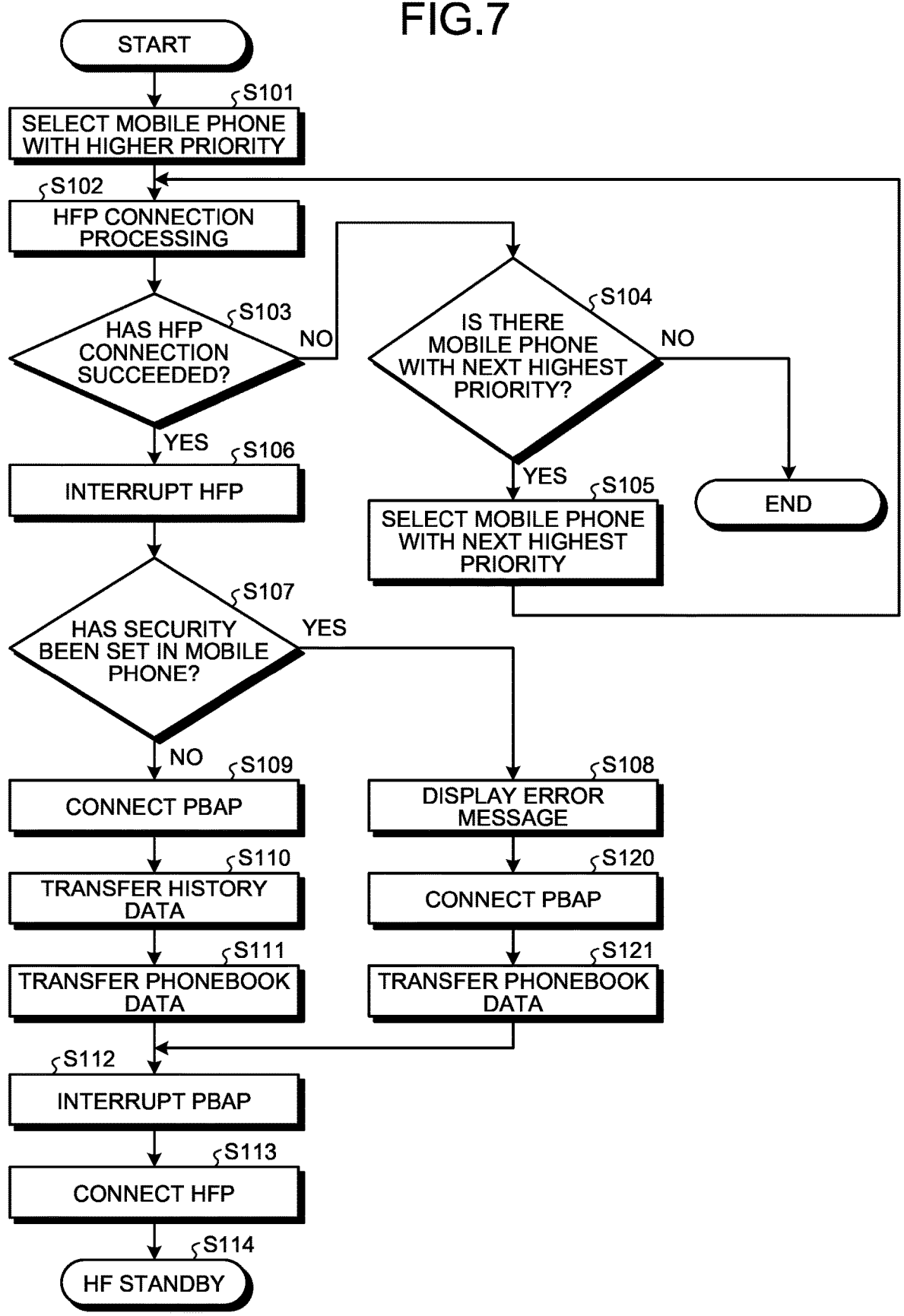
FIG. 7 is a diagram illustrating a third example of a flow of a data transfer process according to the first embodiment.

FIG. 7 is a diagram illustrating a third example of a flow of a data transfer process according to the embodiment. The hands-free apparatus 1 may receive, for example, the outgoing call history data, the incoming call history data, the missed call history data, and the phonebook data from the mobile phone 2 in the flow illustrated in FIG. 7. The processing flow of the third example is almost the same as that of the second example. Accordingly, corresponding processes are assigned the same step numbers as those in the second example, and differences thereof will be described.

In the third example, at S107, the control unit 102 determines whether a security function of prohibiting or restricting the transfer of history data has been set in the mobile phone 2. More specifically, the control unit 102 confirms that the security function of prohibiting or restricting the transfer of the history data is set in the mobile phone 2 and that the security function of prohibiting or restricting the transfer of the phonebook data is not set in the mobile phone 2.

When the determination result of S107 is affirmative ("Yes" at S107), the control unit 102 controls the display unit 15 to display information indicating that the transfer is not possible because the mobile phone 2 is set to prohibit or restrict the transfer of the history data, for example, a message indicating an error (S108). This message may include, for example, more detailed reasons. When the process of S108 ends, the control unit 102 proceeds to S120.

At S120, the control unit 102 automatically connects PBAP wireless communication to a mobile phone 2 that has succeeded in the HFP wireless communication connection. Subsequently, at S121, the control unit 102 transmits a phonebook data transfer request to the mobile phone 2 so as to start a transfer process of phonebook data. Upon receiving the phonebook data transfer request, the mobile phone 2 transfers the phonebook data to the hands-free apparatus 1 by the PBAP Bluetooth communication. The control unit 102 stores the phonebook data transferred from the mobile phone 2 in the working memory 16 or the storage memory 17. When the process of S121 ends, the control unit 102 proceeds to S112.

When the mobile phone 2 is set to prohibit or restrict the transfer of the history data, the hands-free apparatus 1 causes the display unit 15 to display information indicating that the transfer of the history data is not possible. In such a case, the hands-free apparatus 1 receives no history data from the mobile phone 2. This enables the hands-free apparatus 1 to inform a user of the reason why the history data is not downloadable. As a consequence, the hands-free apparatus 1 can improve the convenience of users. Furthermore, the hands-free apparatus 1 can make a user confirm that the history data in the mobile phone 2 is not unintentionally transferred to the hands-free apparatus 1, which makes it possible to reassure the user.

The processes of S107, S108, S120, and S121 illustrated in FIG. 7 can also be incorporated into the process of the first example illustrated in FIG. 5. In such a case, the control unit 102 performs the process of S107 after S6. When the determination result of S107 is negative ("No" at S107), the control unit 102 proceeds to S7. Moreover, the control unit 102 proceeds to S17 after the process of S121.

Fourth Example

Figure 8:
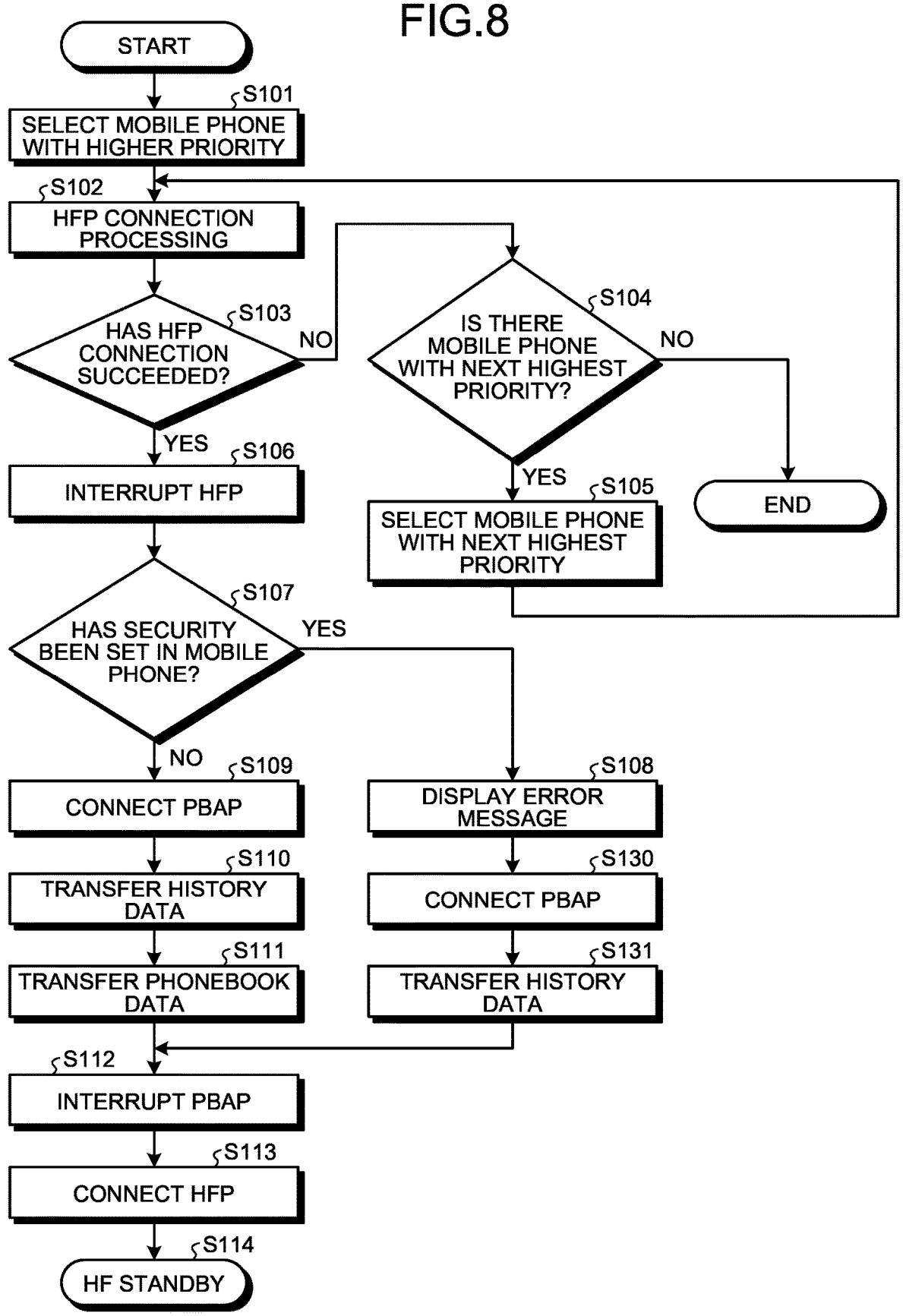
FIG. 8 is a diagram illustrating a fourth example of a flow of a data transfer process according to the first embodiment.

FIG. 8 is a diagram illustrating a fourth example of a flow of a data transfer process according to the embodiment. The hands-free apparatus 1 may receive, for example, the outgoing call history data, the incoming call history data, the missed call history data, and the phonebook data from the mobile phone 2 in the flow illustrated in FIG. 8. The processing flow of the fourth example is almost the same as that of the second example. Accordingly, corresponding processes are assigned the same step numbers as those in the second example, and differences thereof will be described.

In the fourth example, at S107, the control unit 102 determines whether a security function of prohibiting or restricting the transfer of phonebook data has been set in the mobile phone 2. More specifically, the control unit 102 confirms that the security function of prohibiting or restricting the transfer of the phonebook data is set in the mobile phone 2 and that the security function of prohibiting or restricting the transfer of the history data is not set in the mobile phone 2.

When the determination result of S107 is affirmative ("Yes" at S107), the control unit 102 controls the display unit 15 to display information indicating that the transfer is not possible because the mobile phone 2 is set to prohibit or restrict the transfer of the phonebook data, for example, a message indicating an error (S108). This message may include, for example, more detailed reasons. When the process of S108 ends, the control unit 102 proceeds to S130.

At S130, the control unit 102 automatically connects PBAP wireless communication to a mobile phone 2 that has succeeded in the HFP wireless communication connection. Subsequently, at S131, the control unit 102 transmits a history data transfer request to the mobile phone 2 so as to start a transfer process of the history data. Upon receiving the history data transfer request, the mobile phone 2 transfers the history data to the hands-free apparatus 1 by PBAP Bluetooth communication. The control unit 102 stores the history data transferred from the mobile phone 2 in the working memory 16 or the storage memory 17. When the process of S131 ends, the control unit 102 proceeds to S112.

When the mobile phone 2 is set to prohibit or restrict the transfer of the phonebook data, the hands-free apparatus 1 causes the display unit 15 to display information indicating that the transfer of the phonebook data is not possible. In such a case, the hands-free apparatus 1 receives no phonebook data from the mobile phone 2. This enables the hands-free apparatus 1 to inform a user of the reason why the phonebook data is not downloadable. As a consequence, the hands-free apparatus 1 can improve the convenience of users. Furthermore, the hands-free apparatus 1 can make a user confirm that the phonebook data in the mobile phone 2 is not unintentionally transferred to the hands-free apparatus 1, which makes it possible to reassure the user.

The processes of S107, S108, S130, and S131 illustrated in FIG. 8 can also be incorporated into the process of the first example illustrated in FIG. 5. In such a case, the control unit 102 performs the process of S107 after S6. When the determination result of S107 is negative ("No" at S107), the control unit 102 proceeds to S7. Moreover, after the process of S131, the control unit 102 performs the same processes as those of S9 to S15. When it is determined at S15 that the transfer of the history data has been completed ("Yes" at S15), the control unit 102 proceeds to S24.

Fifth Example

FIG. 9 is a diagram illustrating an example of the outgoing call history data, the incoming call history data, the missed call history data, and the all incoming and outgoing call history data The mobile phone 2 may further store the all incoming and outgoing call history data in addition to the outgoing call history data, the incoming call history data, and the missed call history data. In such a case, the hands-free apparatus 1 receives history data including the outgoing call history data, the incoming call history data, the missed call history data, and the all incoming and outgoing call history data from the mobile phone 2. The all incoming and outgoing call history data is data in which incoming call phone numbers, outgoing call phone numbers, and missed call phone numbers are integrated.

Figure 10:
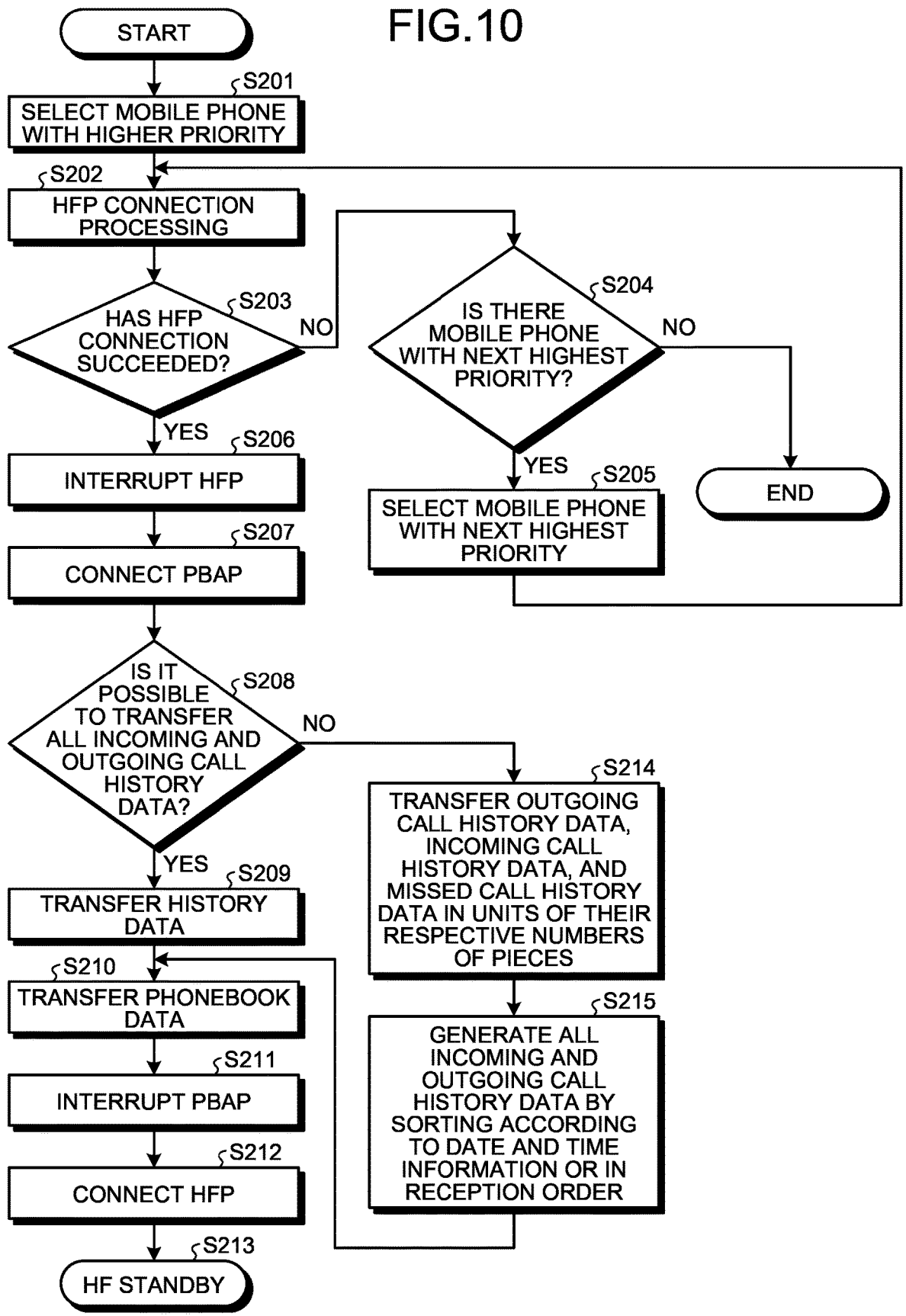
FIG. 10 is a diagram illustrating a fifth example of a flow of a data transfer process according to the first embodiment.

FIG. 10 is a diagram illustrating a fifth example of a flow of a data transfer process according to the embodiment. When it is probable that the mobile phone 2 will store therein the all incoming and outgoing call history data, the hands-free apparatus 1 may receive the history data and the phonebook data from the mobile phone 2 in the flow illustrated in FIG. 10, for example.

First, the control unit 102 performs processes of S201 to S207. Since the processes of S201 to S207 are the same as those of S1 to S7 in FIG. 5, description thereof will be omitted. When the process of S207 ends, the control unit 102 proceeds to S208.

At S208, the control unit 102 determines whether the mobile phone 2 stores therein the all incoming and outgoing call history data and can transfer the all incoming and outgoing call history data.

When the mobile phone 2 stores therein the all incoming and outgoing call history data and can transfer the all incoming and outgoing call history data ("Yes" at S208), the control unit 102 transmits a history data transfer request to the mobile phone 2 so as to start a transfer process of history data (in this example, the outgoing call history data, the incoming call history data, the missed call history data, and the all incoming and outgoing call history data) (S209). Upon receiving the history data transfer request, the mobile phone 2 transfers the history data to the hands-free apparatus 1 by PBAP Bluetooth communication. The control unit 102 stores the history data transferred (downloaded) from the mobile phone 2 in the working memory 16 or the storage memory 17.

When it is determined that the transfer of the history data has been completed, the control unit 102 transmits a phonebook data transfer request to the mobile phone 2 so as to start a transfer process of phonebook data (S210). Upon receiving the phonebook data transfer request, the mobile phone 2 transfers the phonebook data to the hands-free apparatus 1 by the PBAP Bluetooth communication. The control unit 102 stores the phonebook data transferred from the mobile phone 2 in the working memory 16 or the storage memory 17.

When the transfer of the phonebook data has been completed, the control unit 102 interrupts the PBAP wireless communication with the mobile phone 2 (S211). When the PBAP wireless communication is interrupted, the control unit 102 proceeds to S212.

At S212, the control unit 102 automatically connects the HFP wireless communication to the mobile phone 2 again. Then, when the HFP wireless communication with the mobile phone 2 is established, the display control unit 102 proceeds to a hands-free (HF) standby process (S213). When the process proceeds to S26, the control unit 102 ends the process of the present flow.

When the result of S208 is negative ("No" at S208), that is, when the mobile phone 2 stores therein no all incoming and outgoing call history data, the control unit 102 proceeds to S214.

At S214, the control unit 102 transmits a history data transfer request to the mobile phone 2 so that the mobile phone 2 transfers outgoing call history data, incoming call history data, and missed call history data in units of their respective numbers of pieces (S214). Upon receiving the history data transfer request, the mobile phone 2 transfers the preset pieces of outgoing call history data, the preset pieces of incoming call history data, and the preset pieces of missed call history data to the hands-free apparatus 1 by the PBAP Bluetooth communication. For example, the mobile phone 2 transfers, to the hands-free apparatus 1, the predetermined number of pieces (X pieces) of data with the latest outgoing call date and time among the outgoing call history data, the predetermined number of pieces (Y pieces) of data with the latest reception date and time among the incoming call history data, and the predetermined number of pieces (X pieces) of data with the latest reception date and time among the missed call history data. The control unit 102 stores the history data transferred from the mobile phone 2 in the working memory 16 or the storage memory 17.

Next, the control unit 102 generates data in which the predetermined number of pieces of received outgoing call history data, the predetermined number of pieces of received incoming call history data, and the predetermined number of pieces of received missed call history data are collected in one list. Then, when date and time information has been added to respective phone numbers included in the outgoing call history data, the incoming call history data, and the missed call history data, the control unit 102 generates all incoming and outgoing call history data by sorting phone numbers included in the collected data, according to the date and time information.

Furthermore, when the date and time information has not been added to the respective phone numbers included in the outgoing call history data, the incoming call history data, and the missed call history data, the control unit 102 generates all incoming and outgoing call history data by sorting phone numbers included in the collected data, in the order in which they are received from the mobile phone 2. The order in which the hands-free apparatus 1 receives the outgoing call history data, the incoming call history data, and the missed call history data, that is, the order in which the mobile phone 2 transfers the outgoing call history data, the incoming call history data, and the missed call history data, may be any order.

Then, the control unit 102 stores the generated all incoming and outgoing call history data in the working memory 16 or the storage memory 17. When the process of S215 ends, the control unit 102 proceeds to S210.

That is, even when the mobile phone 2 supports no all incoming and outgoing call history request, the hands-free apparatus 1 can generate all incoming and outgoing call history data. Moreover, even when date and time information has not been set in the history data transferred from the mobile phone 2, the hands-free apparatus 1 can generate all incoming and outgoing call history data based on the reception order of each of the incoming call history data, the outgoing call history data, and the missed call history data included in the history data. This enables the hands-free apparatus 1 to improve the convenience of users.

The control unit 102 can also perform a process in which the processes illustrated in the first example to the fourth example are incorporated into the process according to the fifth example.

For example, instead of the respective processes of S209 and S214, the control unit 102 may perform the processes of S9 to S15 in FIG. 5 according to the first example. In such a case, when no reconnection instruction is received at S12, the control unit 102 proceeds to S212. Furthermore, for example, the control unit 102 may perform the processes of S16 to S23 illustrated in FIG. 5 as the process of S210. In such a case, when no reconnection instruction is received at S20, the control unit 102 proceeds to S212.

Furthermore, for example, the control unit 102 may also incorporate the processes of S107 and S108 in FIG. 6 according to the second example into the flow in FIG. 10, incorporate the processes of S107, S108, S120, and S121 in FIG. 7 according to the third example into the flow in FIG. 10, or incorporate the processes of S107, S108, S130, and S131 in FIG. 8 according to the fourth example into the flow of FIG. 10. In such a case, the control unit 102 performs the process of S107 after S206. When the determination result of S107 is negative ("No" at S107), the control unit 102 proceeds to S207. Moreover, the control unit 102 proceeds to S212 after S108 in FIG. 6. Furthermore, the control unit 102 proceeds to S211 after S121 in FIG. 7 or S131 in FIG. 8.

Second Embodiment

A hands-free apparatus 1 according to a second embodiment will be described below. The hands-free apparatus 1 according to the second embodiment has the usage mode as illustrated in FIG. 1 as in the first embodiment.

Figure 11:
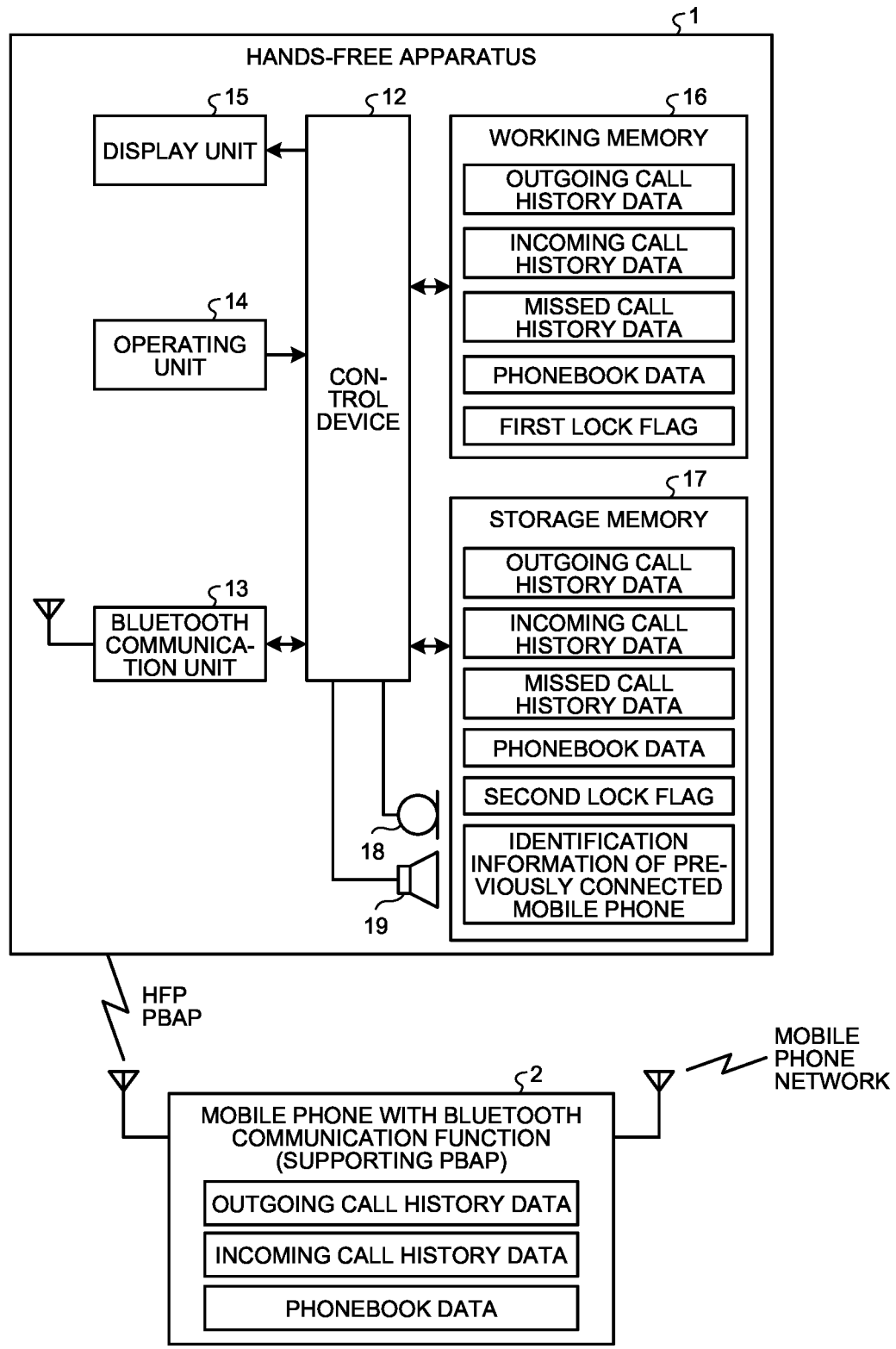
FIG. 11 is a diagram illustrating an example of a hardware configuration of a hands-free apparatus according to a second embodiment.

FIG. 11 is a diagram illustrating an example of a hardware configuration of the hands-free apparatus 1 according to the second embodiment. Since the hardware configuration of the second embodiment is the same as that of the second embodiment illustrated in FIG. 11, differences from the first embodiment will be mainly described.

In the present embodiment, the working memory 16 stores therein a first lock flag. The first lock flag is a flag set by the control device 12 and indicates whether data stored in the working memory 16 and transferred from the mobile phone 2 has been locked. For example, when the first lock flag is "1", it means "access allowed", and when the first lock flag is "0", it means "access not allowed". It is assumed that when the first lock flag is "1", the data stored in the working memory 16 and transferred from the mobile phone 2 has not been locked, and when the first lock flag is "0", the data stored in the working memory 16 and transferred from the mobile phone 2 has been locked.

In the present embodiment, when data is locked, it indicates that access by an application program to the data is not allowed. When first data stored in the working memory 16, that is, the outgoing call history data, the incoming call history data, the missed call history data, and the phonebook data have been locked, for example, it is not allowed to display the phonebook data on the display unit 15 and to display incoming and outgoing call history on the display unit 15. For example, when the first data in the working memory 16 has been locked, a process of viewing the first data stored in the working memory 16 or copying the first data to the outside of the hands-free apparatus 1 is prohibited.

The storage memory 17 stores therein the outgoing call history data, the incoming call history data, the missed call history data, and the phonebook data transferred from the mobile phone 2.

Furthermore, the storage memory 17 stores therein a second lock flag. The second lock flag is a flag set by the control device 12 and indicates whether first data stored in the storage memory 17 and transferred from the mobile phone 2 has been locked. For example, when the second lock flag is "1", the first data stored in the storage memory 17 is locked. In such a case, for example, a process of viewing the first data stored in the storage memory 17 or copying the first data to the outside of the hands-free apparatus 1 is prohibited.

Furthermore, the storage memory 17 stores therein identification information of a mobile phone previously connected to the hands-free apparatus 1. More specifically, the storage memory 17 stores therein the identification information of the mobile phone connected to the hands-free apparatus 1 in the previous HFP connection.

The identification information of the mobile phone is information that can specify the mobile phone, and is, for example, a phone number, an international mobile equipment identifier (IMEI), internal information of a universal subscriber identity module (USIM) card, or the like The USIM card is a SIM card with extended functions. Furthermore, the internal information of the USIM card is, for example, a unique number called international mobile subscriber identity (IMSI) assigned to the SIM card including the USIM card.

Furthermore, the storage memory 17 may also store therein an email address as the identification information of the mobile phone. The email address is not unique information for the mobile phone, but is unique information associated with the user of the mobile phone. Furthermore, as long as the email address is information that can specify the mobile phone or the user of the mobile phone and is information storable in the mobile phone, it may also be stored in the storage memory 17 as the identification information of the mobile phone, other than the aforementioned example.

A storage destination of the identification information of the mobile phone previously connected to the hands-free apparatus 1 is a nonvolatile storage medium, and may be different from a storage destination of the phonebook data and the like. For example, the identification information of the previously connected mobile phone may be stored in a storage unit other than the storage memory 17.

The outgoing call history data, the incoming call history data, the missed call history data, and the phonebook data stored in the working memory 16 and storage memory 17 are examples of the first data in the present embodiment. FIG. 11 illustrates that the working memory 16 and storage memory 17 each store therein the outgoing call history data, the incoming call history data, the missed call history data, and the phonebook data, but all of these data may not be stored. For example, it is assumed that the working memory 16 and the storage memory 17 each store therein at least one of the outgoing call history data, the incoming call history data, the missed call history data, and the phonebook data as the first data. Furthermore, the working memory 16 and the storage memory 17 may further store therein other data transferred from the mobile phone 2, in addition to the outgoing call history data, the incoming call history data, the missed call history data, and the phonebook data.

Furthermore, one or both of the working memory 16 and the storage memory 17 may be a storage device provided outside the hands-free apparatus 1.

Figure 12:
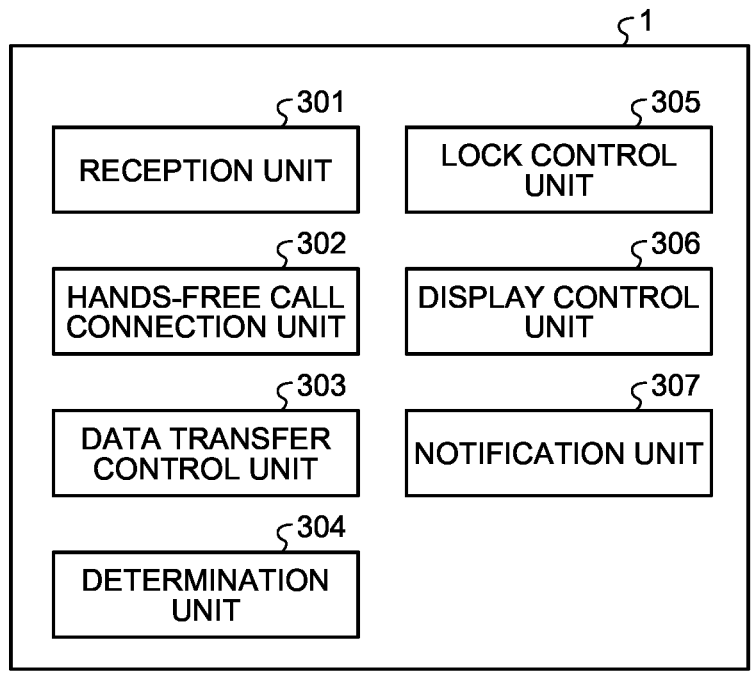
FIG. 12 is a diagram illustrating an example of functions provided in the hands-free apparatus according to the second embodiment.

Next, details of the functions of the hands-free apparatus 1 according to the present embodiment will be described. FIG. 12 is a diagram illustrating an example of the functions provided in the hands-free apparatus 1 according to the present embodiment. As illustrated in FIG. 12, the hands-free apparatus 1 according to the present embodiment includes a reception unit 301, a hands-free call connection unit 302, a data transfer control unit 303, a determination unit 304, a lock control unit 305, a display control unit 306, and a notification unit 307.

The reception unit 301, the hands-free call connection unit 302, the data transfer control unit 303, the determination unit 304, the lock control unit 305, the display control unit 306, and the notification unit 307 are implemented by the control device 12 reading computer programs from the storage memory 17 and executing the read computer programs.

The functions illustrated in FIG. 12 are examples, and the control device 12 of the hands-free apparatus 1 may implement further other functions. In FIG. 11, the hands-free apparatus 1 is described as including one control device 12, one working memory 16, and one storage memory 17, but the number of control devices 12, the number of working memories 16, and the number of storage memories 17 are not limited. For example, a part of the reception unit 301, the hands-free call connection unit 302, the data transfer control unit 303, the determination unit 304, the lock control unit 305, the display control unit 306, and the notification unit 307 may be implemented by another processor or the like.

The reception unit 301 receives user's operations via the operating unit 14. For example, the reception unit 301 receives user's operations for making an outgoing call and receiving an incoming call. Furthermore, the reception unit 301 receives a user's process of inquiring the outgoing call history data, the incoming call history data, the missed call history data, or the phonebook data stored in the working memory 16.

The hands-free call connection unit 302 is HFP-connected to the mobile phone 2 so that a hands-free call can be made. More specifically, the hands-free call connection unit 302 is connected to the mobile phone 2 by controlling the Bluetooth communication unit 13 so that a hands-free call can be made.

After the HFP connection, the hands-free call connection unit 302 receives identification information of the mobile phone 2 from the mobile phone 2 via the Bluetooth communication unit 13, and stores the identification information in the working memory 16 and the storage memory 17.

The data transfer control unit 303 receives the first data including at least one of the outgoing call history data, the incoming call history data, the missed call history data, and the phonebook data stored in the mobile phone 2 from the mobile phone 2 by a PBAP-based communication protocol. In the present embodiment, it is assumed that the data transfer control unit 303 receives all of the outgoing call history data, the incoming call history data, the missed call history data, and the phonebook data from the mobile phone 2. That is, in the present embodiment, the first data includes the outgoing call history data, the incoming call history data, the missed call history data, and the phonebook data.

Furthermore, the data transfer control unit 303 stores the first data received from the mobile phone 2 in the working memory 16 and the storage memory 17.

Furthermore, when it is determined by the determination unit 304 to be described later that the mobile phone 2 is a mobile phone identical to a previously connected mobile phone, the data transfer control unit 303 receives second data, which is the difference from the first data stored in the working memory 16 or the storage memory 17, from the mobile phone 2, and stores the received second data in the working memory 16 and the storage memory 17.

Similarly to the first data, the second data is data including at least one of the outgoing call history data, the incoming call history data, the missed call history data, and the phonebook data stored in the mobile phone 2. In the present embodiment, the second data is data not stored in the working memory 16 and storage memory 17 of the hands-free apparatus 1 among the outgoing call history data, the incoming call history data, the missed call history data, and the phonebook data stored in the mobile phone 2. For example, the data transfer control unit 303 determines whether the data has been transferred to the hands-free apparatus 1, based on an incoming/outgoing call time, an update time, or the like stored in the data stored in the mobile phone 2. When new data that has not yet been transferred to the hands-free apparatus 1 is stored in the mobile phone 2, the data transfer control unit 303 transfers the data to the hands-free apparatus 1 as the second data.

The determination unit 304 determines whether the mobile phone 2 connected to the hands-free apparatus 1 is a mobile phone 2 identical to a previously connected mobile phone 2.

More specifically, the determination unit 304 determines whether the identification information of the mobile phone 2 received by the hands-free call connection unit 302 matches the identification information of the previously connected mobile phone, which is stored in the storage memory 17.

When the identification information of the mobile phone 2 connected to the hands-free apparatus 1 matches the identification information of the previously connected mobile phone, which is stored in the working memory 16 or the storage memory 17, the determination unit 304 determines that the mobile phone 2 connected to the hands-free apparatus 1 is the same mobile phone 2 as the previously connected mobile phone 2.

The determination unit 304 notifies the lock control unit 305 of the determination result as to whether the mobile phone 2 connected to the hands-free apparatus 1 is a mobile phone 2 identical to the previously connected mobile phone 2.

When the identification information of the previously connected mobile phone is not stored in the storage memory 17, the determination unit 304 notifies the lock control unit 305 and the data transfer control unit 303 that a mobile phone 2 connected this time is a mobile phone 2 firstly connected to the hands-free apparatus 1.

The lock control unit 305 locks the first data stored in the working memory 16 when a predetermined condition is satisfied. For example, when the predetermined condition is determined to be satisfied after the first data is stored in the working memory 16 by the data transfer control unit 303, the lock control unit 305 sets the first lock flag of the working memory 16 to "0".

In the present embodiment, the predetermined condition is that connection between the hands-free apparatus 1 and the mobile phone 2 is disconnected. In the present embodiment, when the predetermined condition is satisfied, the lock control unit 305 sets the first lock flag of the working memory 16 to "0".

More specifically, the disconnection between the hands-free apparatus 1 and the mobile phone 2 indicates that the Bluetooth wireless connection between the hands-free apparatus 1 and the mobile phone 2 is disconnected.

Therefore, when the first data is stored in the working memory 16 and the mobile phone 2 is not connected to the hands-free apparatus 1, the first lock flag of the working memory 16 is assumed to be "0". That is, the first data in the working memory 16 is locked when the mobile phone 2, from which the first data is acquired, is not connected to the hands-free apparatus 1. In the present embodiment, it is assumed that the first lock flag of the working memory 16 is set to "0" when the hands-free apparatus 1 is started. For example, when an initial value of the first lock flag is "0" and nothing is set in the first lock flag in an initial state of the working memory 16, the first lock flag may automatically take a value of "0". Alternatively, "0" may be set by the lock control unit 305 when the hands-free apparatus 1 is started.

Furthermore, the lock control unit 305 locks the first data stored in the storage memory 17. It is assumed that the lock control unit 305 locks the first data stored in the storage memory 17, regardless of whether the predetermined condition is satisfied. The first data stored in the storage memory 17 may also be locked by the data transfer control unit 303.

Furthermore, when it is determined by the determination unit 304 that the mobile phone 2 connected this time is a mobile phone identical to the previously connected mobile phone, the lock control unit 305 unlocks the first data stored in the working memory 16. That is, in such a case, the lock control unit 305 changes the first lock flag of the working memory 16 from "0" to "1".

Furthermore, when it is determined by the determination unit 304 that the mobile phone 2 connected this time is a mobile phone identical to the previously connected mobile phone and the first data is not stored in the working memory 16, the lock control unit 305 unlocks the first data stored in the storage memory 17 and copies the first data from the storage memory 17 to the working memory 16.

Furthermore, when it is determined by the determination unit 304 that the mobile phone 2 connected this time is not a mobile phone identical to the previously connected mobile phone, the lock control unit 305 deletes the first data from the working memory 16 and the storage memory 17. The process of deleting the first data from the working memory 16 and the storage memory 17 may be performed by a functional unit different from the lock control unit 305, for example, a deletion unit or the like.

The display control unit 306 causes the display unit 15 to display various screens. For example, the display control unit 306 causes the display unit 15 to display a display screen, in which dial keys are arranged, as a display screen on which a user inputs a phone number. Furthermore, the display control unit 306 causes the display unit 15 to display the outgoing call history data, the incoming call history data, or the phonebook data according to a user's operation received by the reception unit 301.

In a case where the first data stored in the working memory 16 has been locked, when the reception unit 301 receives a user's operation regarding access to the first data, the notification unit 307 informs that access to the first data is not possible.

Figure 13:
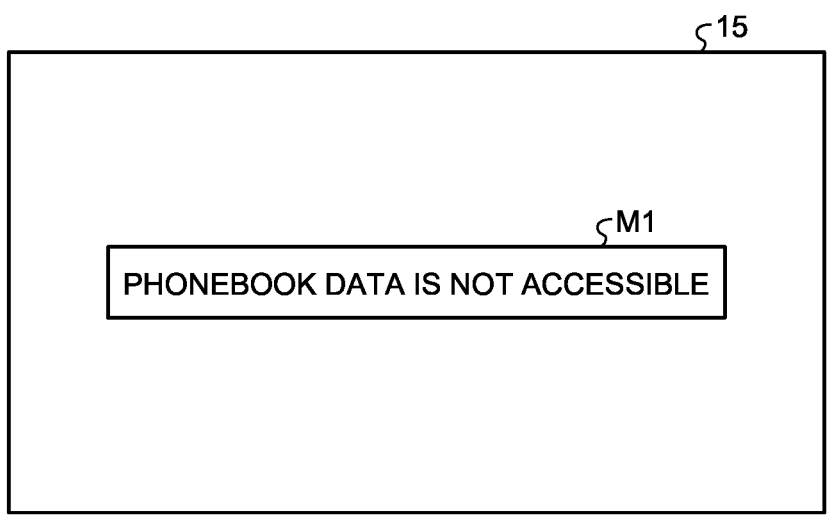
FIG. 13 is a diagram illustrating an example of notification according to the second embodiment.

FIG. 13 is a diagram illustrating an example of notification according to the second embodiment. For example, when a user operates to inquire the phonebook data, the notification unit 307 causes the display unit 15 to display a message M1 "Phonebook data is not accessible". The notification method is not limited thereto. For example, the notification unit 307 may cause the speaker 19 to output the message M1 by voice.

When it is probable that a user will make an access, such as viewing, to the first data stored in the storage memory 17 as well as the working memory 16, the access to the storage memory 17 may also be notified. For example, in a case where the first data stored in the storage memory 17 has been locked, when the reception unit 301 receives a user's operation regarding access to the first data, the notification unit 307 notifies that access to the first data is not possible.

Furthermore, the content of the message M1 is not limited to the example illustrated in FIG. 13, and may, more specifically, describe the reason why a user is not able to access the phonebook data. For example, the message M1 may be a sentence indicating that the phonebook data is not allowed to be displayed on the display unit 15 of the hands-free apparatus 1 because the wireless connection between the mobile phone 2 and the hands-free apparatus 1 has been disconnected. Furthermore, although the notification unit 307 is illustrated in FIG. 12 as a functional unit different from the display control unit 306, the function of displaying the message M1 on the display unit 15 may be a function of the display control unit 306.

Next, a flow of a data transfer process performed by the hands-free apparatus 1 according to the present embodiment configured as described above will be described.

Figure 14:
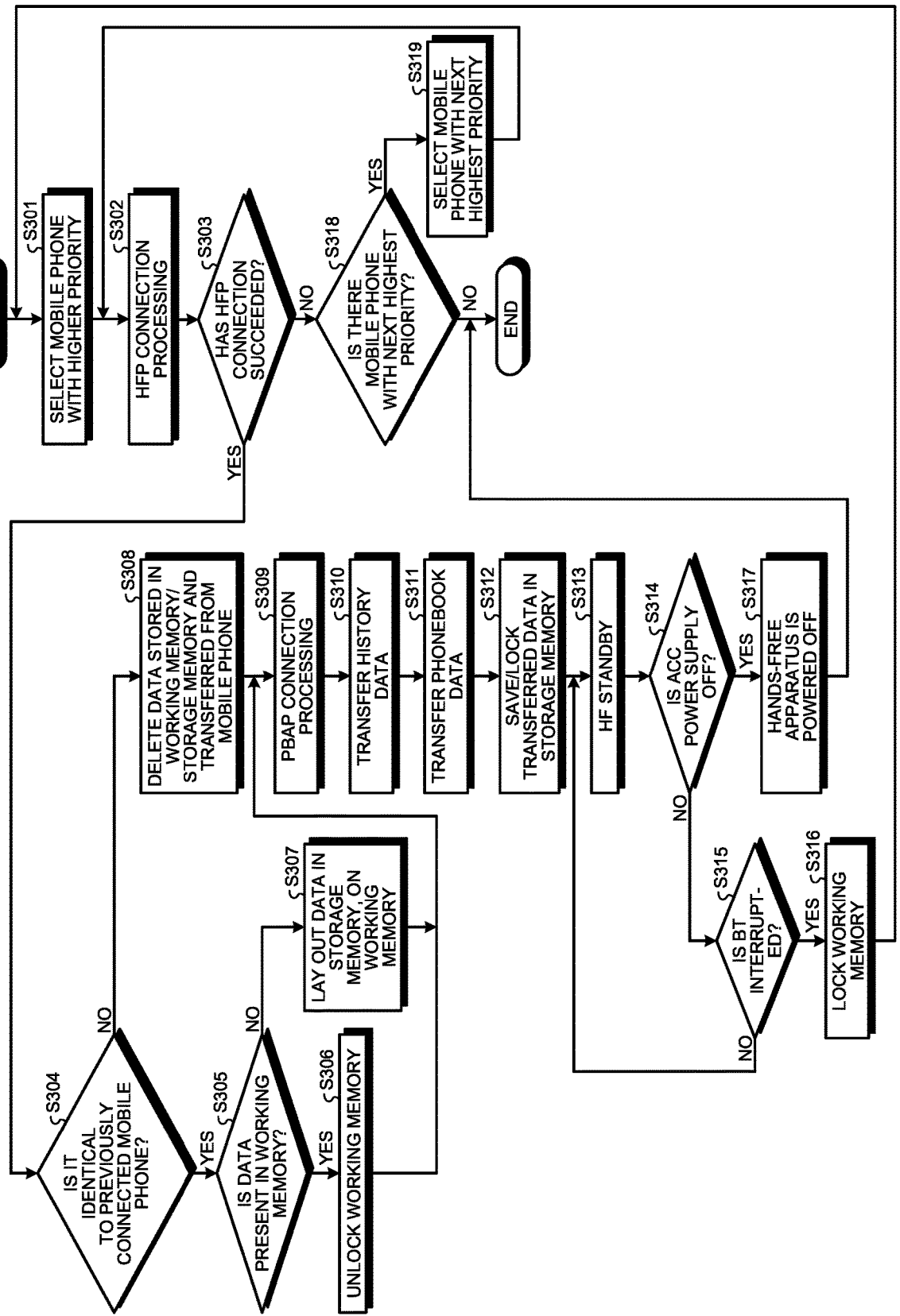
FIG. 14 is a diagram illustrating an example of a flow of a data transfer process according to the second embodiment.

FIG. 14 is a diagram illustrating an example of the flow of the data transfer process according to the second embodiment. It is assumed that a user has pre-registered one or two mobile phones to be a Bluetooth communication partner in the hands-free apparatus 1. It is also assumed that both the first lock flag and the second lock flag are set to "0" at the start of this flowchart.

First, the hands-free call connection unit 302 selects a mobile phone 2 with a higher priority as a communication connection target in HFP wireless communication (S301). In the present example, HFP initial communication is first automatically attempted to start connection without performing PBAP communication connection first.

Next, the hands-free call connection unit 302 performs an HFP wireless connection process for the selected mobile phone 2 (S302). Furthermore, the hands-free call connection unit 302 determines whether the HFP wireless communication connection has succeeded (S303).

When it is determined that the HFP wireless communication connection has succeeded ("Yes" at S303), the hands-free call connection unit 302 receives identification information of the mobile phone 2 to be connected from the mobile phone 2. Then, based on the identification information of the mobile phone 2 received by the hands-free call connection unit 302 and identification information of a previously connected mobile phone, which is stored in the storage memory 17, the determination unit 304 determines whether the mobile phone 2 connected to the hands-free apparatus 1 this time is a mobile phone identical to the previously connected mobile phone (S304). Furthermore, the hands-free call connection unit 302 stores identification information of the mobile phone 2 connected this time in the storage memory 17.

Although not illustrated in FIG. 14, when the identification information of the previously connected mobile phone is not stored in the storage memory 17, the determination unit 304 determines that the mobile phone 2 connected this time is a mobile phone 2 firstly connected to the hands-free apparatus 1. In such a case, the determination unit 304 notifies the lock control unit 305 and the data transfer control unit 303 that the mobile phone 2 connected this time is the mobile phone 2 firstly connected to the hands-free apparatus 1. In such a case, processes of S305 to S308 are not performed and a process of S309 to be described later is performed.

When the determination unit 304 determines that the mobile phone 2 connected to the hands-free apparatus 1 this time is a mobile phone identical to the previously connected mobile phone ("Yes" at S304), the lock control unit 305 determines whether the first data is present in the working memory 16 (S305).

When the first data is present in the working memory 16 ("Yes" at S305), the lock control unit 305 unlocks the first data stored in the working memory 16 (S306). For example, the lock control unit 305 changes the first lock flag of the working memory 16 from "0" to "1". Unlocking the first data stored in the working memory 16 is also referred to as simply unlocking the working memory 16.

When the first data is not present in the working memory 16 ("No" at S305), the lock control unit 305 unlocks the first data stored in the storage memory 17 and lays out the first data stored in the storage memory 17, on the working memory 16 (S307).

When the determination unit 304 determines that the mobile phone 2 connected to the hands-free apparatus 1 this time is not a mobile phone 2 identical to the previously connected mobile phone ("No" at S304), the lock control unit 305 deletes the first data transferred from the previously connected mobile phone from the working memory 16 and the storage memory 17 (S308). When the working memory 16 or the storage memory 17 includes, in addition to the first data transferred from the previously connected mobile phone, outgoing call history data, incoming call history data, or missed call history data related to calls made and received while the hands-free apparatus 1 is connected to the previously connected mobile phone, the lock control unit 305 deletes these data as well. The outgoing call history data, the incoming call history data, or the missed call history data related to calls made and received while the hands-free apparatus 1 is connected to the previously connected mobile phone may also be referred to as first data.

Then, PBAP wireless connection processing is performed for the mobile phone 2 having succeeded in the HFP wireless connection (S309). Next, the data transfer control unit 303 performs a transfer process of the first data from the mobile phone 2. As described above, in the present embodiment, the first data includes the outgoing call history data, the incoming call history data, the missed call history data, and the phonebook data. First, the data transfer control unit 303 causes the outgoing call history data, the incoming call history data, and the missed call history data to be transferred from the mobile phone 2 to the hands-free apparatus 1 (S310).

Furthermore, the data transfer control unit 303 causes the phonebook data to be transferred from the mobile phone 2 to the hands-free apparatus 1 (S311).

When the first data at the time of the previous connection is stored in the working memory 16 via the process of S306 or S307, in the processes of S310 and S311, the data transfer control unit 303 causes only the second data, which is the difference from the previous time, to be transferred from the mobile phone 2 to the hands-free apparatus 1, and adds the second data to the first data already stored in the working memory 16.

Furthermore, the data transfer control unit 303 saves, that is, stores, in the storage memory 17, the outgoing call history data, the incoming call history data, the missed call history data, and the phonebook data transferred from the mobile phone 2 as the first data. Then, the lock control unit 305 locks the first data stored in the storage memory 17 by, for example, setting "0" in the second lock flag of the storage memory 17. (S312). When only the second data, which is the difference from the previous time, is transferred from the mobile phone 2 in the processes of S310 and S311, after the first data and the second data are combined in the working memory 16, the data transfer control unit 303 stores the combined data in the storage memory 17 from the working memory 16.

Figure 15:
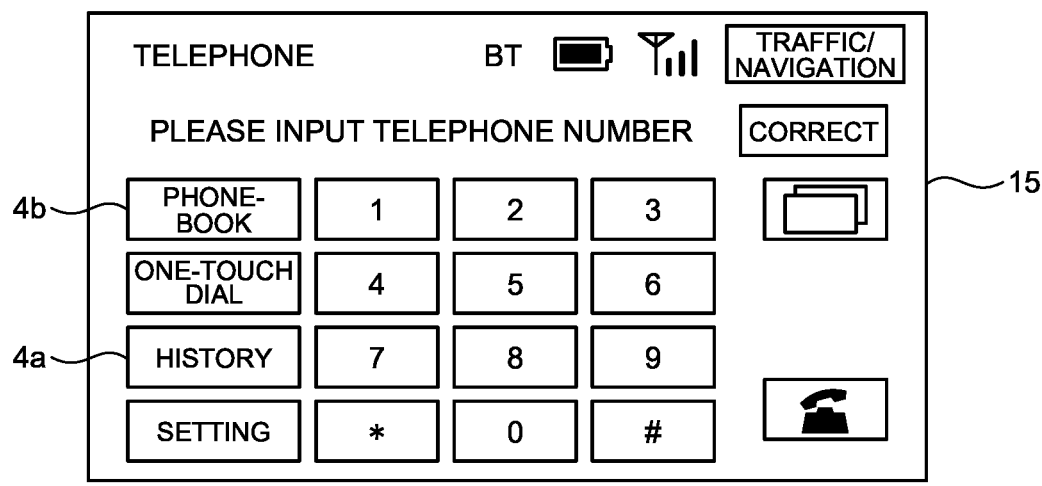
FIG. 15 is a diagram illustrating an example of a hands-free standby screen according to the second embodiment.

Then, the hands-free call connection unit 302 continues the HFP connection and waits in a hands-free (HF) standby state in which a hands-free call can be made and received (S313). In such a case, the display control unit 306 may cause the display unit 15 to display a hands-free standby screen on which calls can be made and received. FIG. 15 is a diagram illustrating an example of a hands-free standby screen according to the second embodiment. In the example illustrated in FIG. 15, for example, the display control unit 306 causes the display unit 15 to display dial keys ("0" to "9" numeric keys). A user can make a call by operating the dial keys and inputting a phone number. The hands-free standby screen may include a history button 4a and a phonebook button 4b. The history button 4a is a button for receiving a user's operation of inquiring the outgoing call history data, the incoming call history data, or the missed call history data. The phonebook button 4b is a button for receiving a user's operation of inquiring the phonebook data.

In the present embodiment, even after the outgoing call history data, the incoming call history data, the missed call history data, and the phonebook data are transferred from the mobile phone 2 to the hands-free apparatus 1, the PBAP connection between the mobile phone 2 and the hands-free apparatus 1 is continued; however, the data transfer control unit 303 may disconnect the PBAP connection between the mobile phone 2 and the hands-free apparatus 1 after the transfer of these data are completed.

Next, the lock control unit 305 determines whether an ACC power supply is in an OFF state (S314). When the ACC power supply is in an ON state ("No" at S314), the lock control unit 305 determines whether the Bluetooth communication between the mobile phone 2 and the hands-free apparatus 1 has been interrupted (S315).

When the ACC power supply is in the ON state and the Bluetooth communication between the mobile phone 2 and the hands-free apparatus 1 is being connected ("No" at S315), the lock control unit 305 returns to S313 and continues the standby state.

When the ACC power supply is in the OFF state ("Yes" at S314), the hands-free apparatus 1 is powered off (S317), and the process of this flowchart ends.

Furthermore, when the Bluetooth communication between the mobile phone 2 and the hands-free apparatus 1 has been interrupted ("Yes" at S315), the lock control unit 305 sets the first lock flag of the working memory 16 to "0" and locks the first data in the working memory 16 (S316). Then, the lock control unit 305 returns to the process of S301 and starts to search for a mobile phone to be connected.

Furthermore, when it is determined that the HFP wireless communication connection has failed ("No" at S303), the hands-free call connection unit 302 determines whether a mobile phone 2 with the next highest priority exists (S318).

When it is determined that the mobile phone 2 with the next highest priority exists ("Yes" at S318), the hands-free call connection unit 302 selects the mobile phone 2 with the next highest priority as a wireless communication connection target (S319), returns to the process of S302 described above, and repeats the processes described above.

Furthermore, when it is determined that the mobile phone 2 with the next highest priority does not exist ("No" at S318), the hands-free call connection unit 302 ends the process of the flowchart.

In this way, with the hands-free apparatus 1 according to the present embodiment, when the predetermined condition is satisfied, the first data stored in the working memory 16 is locked, so that the level of protection against personal information included in data transferred from the mobile phone 2 can be improved.

For example, with the hands-free apparatus 1 according to the present embodiment, when the user of the mobile phone 2 gets off the vehicle 3 together with the mobile phone 2 due to a change or the like of a driver, access by other drivers after the change, to the phonebook data or the like of a previous driver stored in the hands-free apparatus 1 can be prohibited. Alternatively, in a case where a plurality of passengers are in the vehicle 3, when the user of the mobile phone 2 temporarily gets off the vehicle 3 together with the mobile phone 2, access by other drivers to the phonebook data or the like stored in the hands-free apparatus 1 can be prohibited until the user of the mobile phone 2 returns. This can reduce introduction of personal information included in the phonebook data or the like to others under circumstances unintended by a user.

Furthermore, the hands-free apparatus 1 according to the present embodiment determines whether the mobile phone 2 is a mobile phone identical to a previously connected mobile phone, and unlocks the first data stored in the working memory 16 when it is determined that the mobile phone 2 connected this time is a mobile phone identical to the previously connected mobile phone. Therefore, with the hands-free apparatus 1 according to the present embodiment, for example, when the user of the mobile phone 2 temporarily gets off the vehicle 3 together with the mobile phone 2, the first data stored in the hands-free apparatus 1 is prohibited from being viewed by others by locking access to the first data during the absence of the user in the vehicle 3. Then, when the user of the mobile phone 2 returns to the vehicle 3 together with the mobile phone 2, the locking is released again, so that already transferred phonebook data or the like need not to be transferred again. This enables the user who has returned to the vehicle 3 to quickly use the hands-free apparatus 1.

Furthermore, the hands-free apparatus 1 according to the present embodiment stores the first data in the nonvolatile storage memory 17 and locks the first data. While data stored in the volatile working memory 16 disappears when the hands-free apparatus 1 is powered off, the storage memory 17 holds therein data even when the hands-free apparatus 1 is powered off. Accordingly, the first data is stored in the nonvolatile storage memory 17, so that the first data can continuously be stored even when the hands-free apparatus 1 is powered off.

Furthermore, when it is determined that the mobile phone 2 connected this time is a mobile phone identical to the previously connected mobile phone and when the first data is not stored in the working memory 16, the hands-free apparatus 1 according to the present embodiment unlocks the first data stored in the storage memory 17 and copies the first data from the storage memory 17 to the working memory 16. For example, it is assumed that after the hands-free apparatus 1 is powered off by turning off the ACC power supply when a driver gets off a vehicle, the hands-free apparatus 1 is powered on by turning on the ACC power supply when the driver gets in the vehicle again. with the hands-free apparatus 1 according to the present embodiment, when the same mobile phone 2 as the previous one is subsequently connected to the hands-free apparatus 1, already transferred phonebook data or the like need not to be transferred again. Furthermore, since the first data stored in the storage memory 17 is locked except when it is copied to the working memory 16, possibilities of direct viewing of the first data stored in the storage memory 17 and copying the first data to the outside of the hands-free apparatus 1 can be reduced.

Furthermore, when it is determined that the mobile phone 2 connected this time is not a mobile phone identical to the previously connected mobile phone, the hands-free apparatus 1 according to the present embodiment deletes the first data from the working memory 16 and the storage memory 17. Therefore, with the hands-free apparatus 1 according to the present embodiment, when a mobile phone 2 connected to the hands-free apparatus 1 is changed due to a change or the like of a driver, data transferred from the mobile phone 2 before the change is deleted, thereby reducing the risk that personal information included in the data will be viewed under circumstances unintended by the user of the mobile phone 2 before the change.

Furthermore, when it is determined that the mobile phone 2 connected this time is a mobile phone identical to the previously connected mobile phone, the hands-free apparatus 1 according to the present embodiment receives the second data, which is the difference from the first data, from the mobile phone 2 and stores the received second data in the working memory 16 and the storage memory 17. Therefore, with the hands-free apparatus 1 according to the present embodiment, when the same mobile phone 2 is continuously connected, data transferred in the previous connection is not transferred again and only the difference is updated, thereby reducing a data transfer time.

Furthermore, in a case where the first data stored in the working memory 16 has been locked, when a user's operation regarding access to the first data is received, the hands-free apparatus 1 according to the present embodiment notifies that access to the first data is not possible. Therefore, with the hands-free apparatus 1 according to the present embodiment, the user can ascertain that the phonebook data or the like stored in the hands-free apparatus 1 has been locked.

Third Embodiment

In the second embodiment described above, it is determined whether locking is released, depending on whether the mobile phone 2 connected this time is a mobile phone 2 identical to the previously connected mobile phone 2. In a third embodiment, it is determined whether locking is released, depending on whether the mobile phone 2 connected this time has ever been connected to the hands-free apparatus 1 in the past, not limited to the previous connection.

In the present embodiment, the following description will be given on the assumption that the vehicle 3 provided with the hands-free apparatus 1 may be used by, for example, a plurality of members such as family members or employees of the same company.

Figure 16:
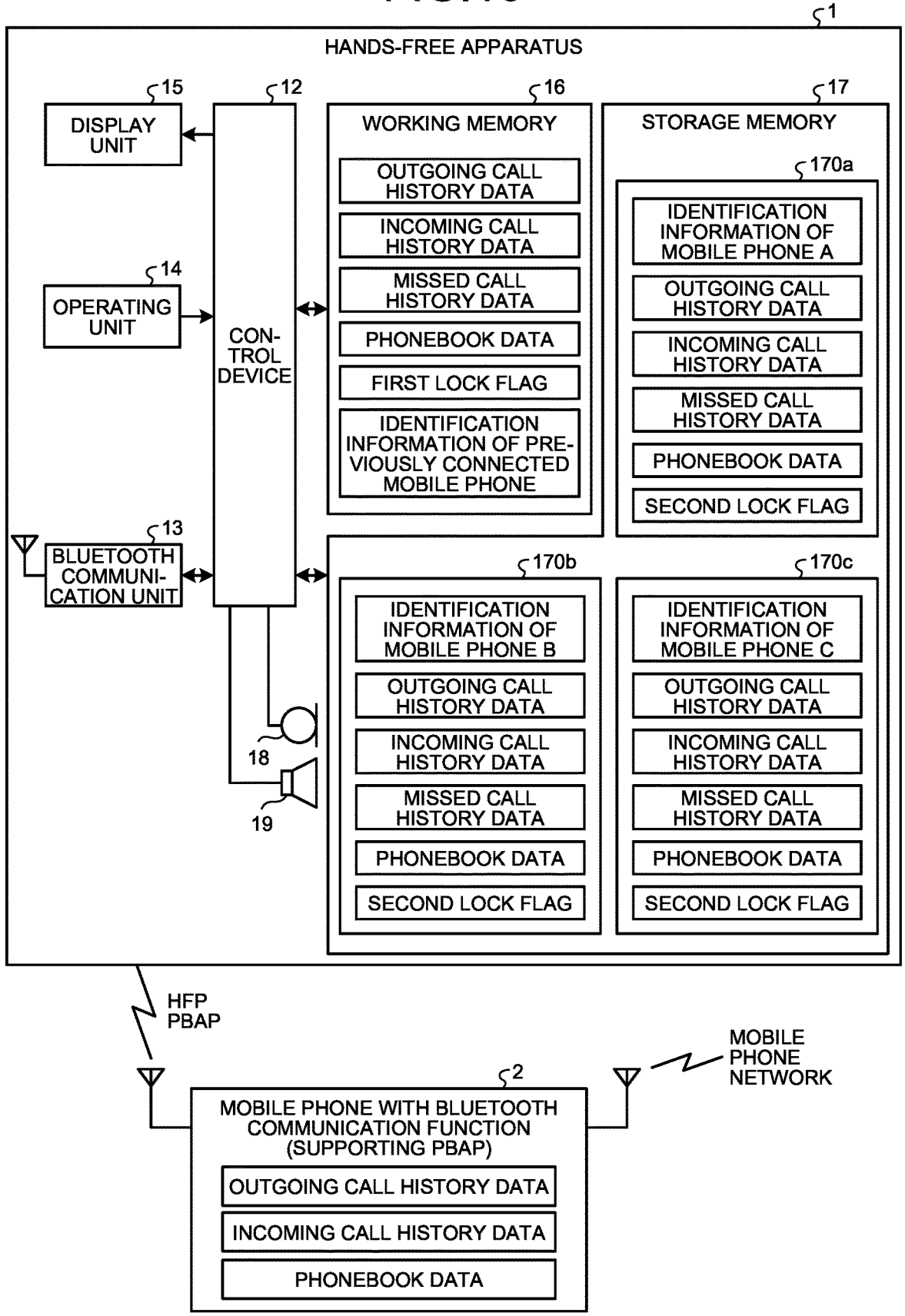
FIG. 16 is a diagram illustrating an example of a hardware configuration of a hands-free apparatus according to a third embodiment.

FIG. 16 is a diagram illustrating an example of a hardware configuration of a hands-free apparatus 1 according to the third embodiment. The hands-free apparatus 1 according to the present embodiment includes a control device 12, a Bluetooth communication unit 13, an operating unit 14, a display unit 15, a working memory 16, a storage memory 17, a microphone 18, and a speaker 19, as in the second embodiment.

Furthermore, the working memory 16 of the hands-free apparatus 1 according to the present embodiment stores therein identification information of a previously connected mobile phone in addition to the same information as in the second embodiment. The identification information of the previously connected mobile phone in the present embodiment is identification information of a mobile phone from which the outgoing call history data, the incoming call history data, the missed call history data, and the phonebook data, which are the first data currently stored in the working memory 16, are acquired.

Furthermore, in the present embodiment, when outgoing call history data, incoming call history data, missed call history data, and phonebook data associated with identification information of a mobile phone different from a mobile phone 2 connected this time are stored in the working memory 16, these pieces of data are referred to as third data.

Furthermore, the storage memory 17 according to the present embodiment stores therein data transferred from a plurality of mobile phones connected to the hands-free apparatus 1 in the past, identification information of the mobile phones connected to the hands-free apparatus 1 in the past, and a second lock flag for each of the mobile phones connected to the hands-free apparatus 1 in the past in association with one another.

In FIG. 16, as an example, the storage memory 17 includes a storage area 170a, a storage area 170b, and a storage area 170c. The storage area 170a stores therein identification information, outgoing call history data, incoming call history data, missed call history data, phonebook data, and a second lock flag related to these data of a mobile phone A connected to the hands-free apparatus 1 in the past.

Furthermore, the storage area 170b stores therein identification information, outgoing call history data, incoming call history data, missed call history data, phonebook data, and a second lock flag related to these data of a mobile phone B connected to the hands-free apparatus 1 in the past.

Furthermore, the storage area 170c stores therein identification information, outgoing call history data, incoming call history data, missed call history data, phonebook data, and a second lock flag related to these data of a mobile phone C connected to the hands-free apparatus 1 in the past.

In the present embodiment, the pieces of data related to the three mobile phones connected to the hands-free apparatus 1 in the past are stored in the storage memory 17, but the number of mobile phones as storage targets is not limited thereto. For example, an upper limit of the number of mobile phones stored in the storage memory 17 and connected to the hands-free apparatus 1 in the past may be set. In such a case, for example, data related to a mobile phone with the oldest connection time may be deleted in order.

As in the second embodiment, the hands-free apparatus 1 according to the present embodiment includes a reception unit 301, a hands-free call connection unit 302, a data transfer control unit 303, a determination unit 304, a lock control unit 305, a display control unit 306, and a notification unit 307. The reception unit 301, the hands-free call connection unit 302, the display control unit 306, and the notification unit 307 have the same functions as in the second embodiment.

The determination unit 304 according to the present embodiment determines whether the hands-free apparatus 1 was connected in the past to the mobile phone 2 connected this time with the functions in the second embodiment provided. More specifically, the determination unit 304 compares the identification information of the mobile phone 2 received by the hands-free call connection unit 302 with the identification information of the mobile phones stored in the storage memory 17. When identification information that matches the identification information of the mobile phone 2 received by the hands-free call connection unit 302 is stored in the storage memory 17, the determination unit 304 determines that the hands-free apparatus 1 was connected in the past to the mobile phone 2 connected this time.

The data transfer control unit 303 according to the present embodiment stores first data acquired from the mobile phone 2 connected this time in the working memory 16 and the storage memory 17 in association with identification information that can specify the mobile phone 2 from which the first data is acquired, with the functions in the second embodiment provided.

Furthermore, when it is determined by the determination unit 304 that the hands-free apparatus 1 was connected in the past to the mobile phone 2, the data transfer control unit 303 according to the present embodiment receives the second data that is data including at least one of the outgoing call history data, the incoming call history data, the missed call history data, and the phonebook data stored in the mobile phone 2 and is the difference from the first data stored in the working memory 16 or the storage memory 17, and stores the received second data in the working memory 16 and the storage memory 17.

The lock control unit 305 according to the present embodiment unlocks the first data when it is determined by the determination unit 304 that the hands-free apparatus 1 was connected in the past to the mobile phone 2 and when the first data associated with the identification information of the mobile phone 2 is stored in the working memory 16, with the functions in the second embodiment provided.

Furthermore, when it is determined by the determination unit 304 that the hands-free apparatus 1 was connected in the past to the mobile phone 2 and when the third data associated with the identification information of a mobile phone different from the mobile phone 2 is stored in the working memory 16, the lock control unit 305 deletes the third data, unlocks the first data stored in the storage memory 17, and then copies the first data from the storage memory 17 to the working memory 16.

Furthermore, when it is determined by the determination unit 304 that the hands-free apparatus 1 was connected in the past to the mobile phone 2 and when neither the first data nor the third data is stored in the working memory 16, the lock control unit 305 unlocks the first data stored in the storage memory 17 and copies the first data from the storage memory 17 to the working memory 16.

Furthermore, when it is determined by the determination unit 304 that the hands-free apparatus 1 was not connected in the past to the mobile phone 2, the lock control unit 305 deletes the first data from the working memory 16 and does not delete the first data from the storage memory 17.

Figure 17:
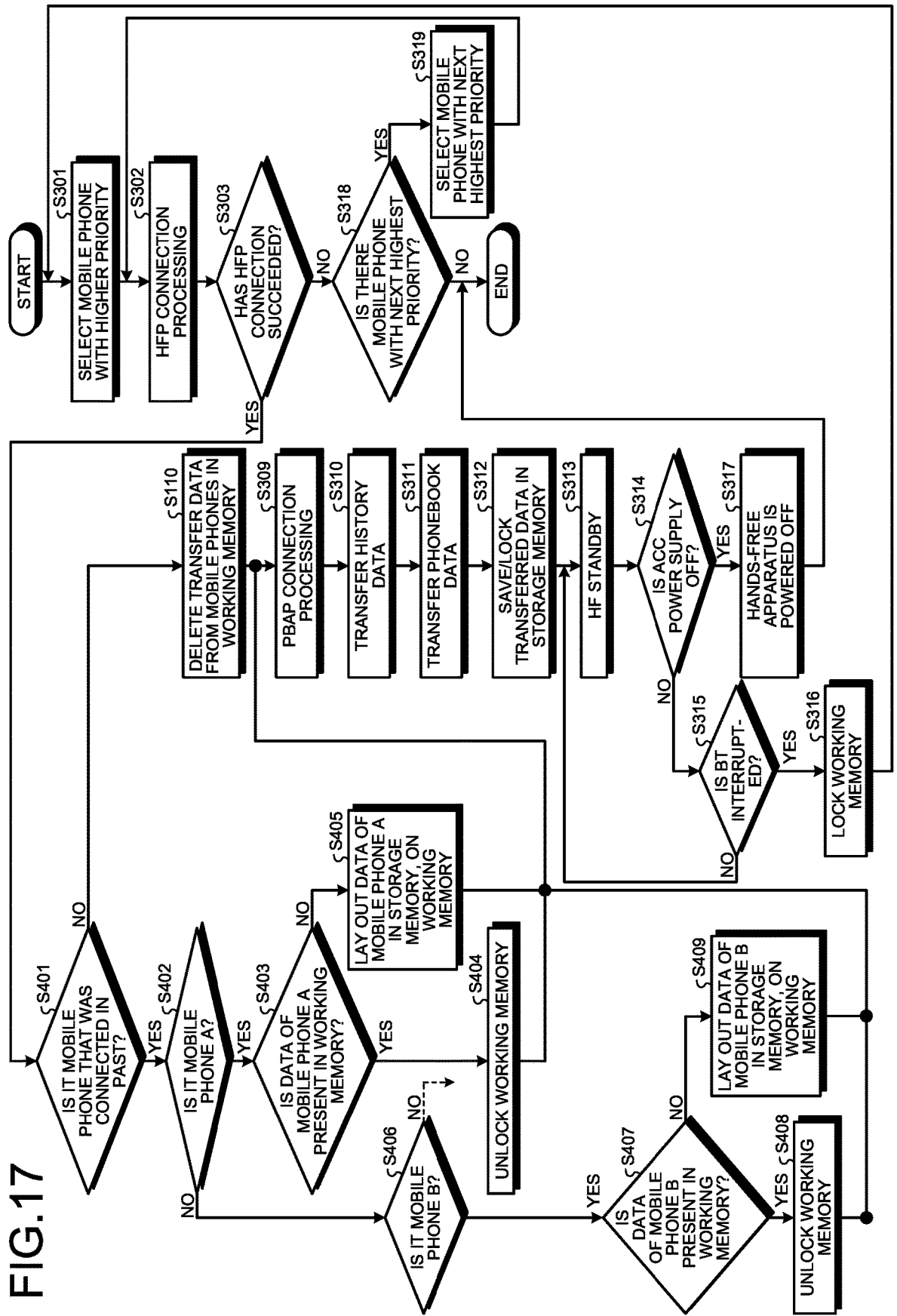
FIG. 17 is a diagram illustrating an example of a flow of a data transfer process according to the third embodiment.

FIG. 17 is a diagram illustrating an example of a flow of a data transfer process according to the third embodiment. A process of selecting a mobile phone with a higher priority at S301 to a process of determining whether HFP connection has succeeded at S303 are the same as those in the second embodiment described with reference to FIG. 14.

When it is determined that the HFP wireless communication connection has succeeded ("Yes" at S303), the hands-free call connection unit 302 receives identification information of the mobile phone 2 to be connected from the mobile phone 2. Then, based on the identification information of the mobile phone 2 received by the hands-free call connection unit 302 and identification information of a plurality of mobile phones connected in the past, which is stored in the storage memory 17, the determination unit 304 determines whether the mobile phone 2 connected to the hands-free apparatus 1 this time is a mobile phone that was connected in the past (S401).

When the mobile phone 2 connected to the hands-free apparatus 1 this time is the mobile phone A connected in the past ("Yes" at S401 and "Yes" at S402), the lock control unit 305 determines whether data transferred from the mobile phone A is stored in the working memory 16 (S403). For example, when identification information of a previously connected mobile phone, which is stored in the working memory 16, matches the identification information of the mobile phone 2 received by the hands-free call connection unit 302, the lock control unit 305 determines that the data transferred from the mobile phone A is stored in the working memory 16.

When it is determined that the data transferred from the mobile phone A is stored in the working memory 16 ("Yes" at S403), the lock control unit 305 unlocks the working memory 16 (S404).

When the data transferred from the mobile phone A is not stored in the working memory 16, the working memory 16 does not store therein any data transferred from any mobile phone, or stores therein data transferred from a mobile phone other than the mobile phone A, that is, the third data. When no data transferred from any mobile phone is stored in the working memory 16, the lock control unit 305 lays out the data of the mobile phone A stored in the storage area 170a of the storage memory 17, on the working memory 16 (S405). When the data transferred from the mobile phone other than the mobile phone A, that is, the third data, is stored, the lock control unit 305 deletes the third data stored in the working memory 16, and then lays out the data of the mobile phone A stored in the storage area 170a of the storage memory 17, on the working memory 16.

Furthermore, when the mobile phone 2 connected to the hands-free apparatus 1 this time is not the mobile phone A connected in the past ("No" at S402), the lock control unit 305 determines whether the mobile phone 2 connected to the hands-free apparatus 1 this time is the mobile phone B connected in the past (S406).

When the mobile phone 2 connected to the hands-free apparatus 1 this time is the mobile phone B connected in the past ("Yes" at S406), the lock control unit 305 determines whether data transferred from the mobile phone B is stored in the working memory 16 (S407).

When the data transferred from the mobile phone B is stored in the working memory 16 ("Yes" at S407), the lock control unit 305 unlocks the working memory 16 (S408).

When the data transferred from the mobile phone B is not stored in the working memory 16 ("No" at S407), the lock control unit 305 lays out the data of the mobile phone B stored in the storage area 170b of the storage memory 17, on the working memory 16 (S409). When data transferred from a mobile phone other than the mobile phone B, that is, the third data is stored, the lock control unit 305 deletes the third data stored in the working memory 16, and then lays out the data of the mobile phone B stored in the storage area 170*b* of the storage memory 17, on the working memory 16.

When the mobile phone 2 connected to the hands-free apparatus 1 is not the mobile phone B connected in the past ("No" at S406), the lock control unit 305 repeatedly determines whether the identification information of the mobile phone 2 received by the hands-free call connection unit 302 matches the identification information of another mobile phone connected in the past, which is stored in the storage memory 17.

When the mobile phone 2 connected to the hands-free apparatus 1 has never been connected to the hands-free apparatus 1 in the past ("No" at S401), the lock control unit 305 deletes transfer data from other mobile phones in the working memory 16.

Processes after the PBAP connection process at S309 are the same as those of the second embodiment.

In this way, when it is determined that the mobile phone 2 connected this time has ever been connected to the hands-free apparatus 1 in the past and when the first data associated with the identification information of the mobile phone 2 is stored in the working memory 16, the hands-free apparatus 1 according to the present embodiment unlocks the first data. Therefore, with the hands-free apparatus 1 according to the present embodiment, even when there are a plurality of mobile phone candidates that may be connected to the hands-free apparatus 1, data transferred from the mobile phones to the hands-free apparatus 1 in the past can be utilized, thereby reducing a data transfer time.

Furthermore, when it is determined that the mobile phone 2 connected this time has ever been connected to the hands-free apparatus 1 in the past and when the third data associated with the identification information of a mobile phone different from the mobile phone 2 is stored in the working memory 16, the hands-free apparatus 1 according to the present embodiment deletes the third data, unlocks the first data stored in the storage memory 17, and then copies the first data from the storage memory 17 to the working memory 16. Therefore, with the hands-free apparatus 1 according to the present embodiment, data can be deleted appropriately according to the connected mobile phone 2 so that data transferred from other mobile phones 2 are not viewed by a current user.

Furthermore, when it is determined that the mobile phone 2 connected this time has ever been connected to the hands-free apparatus 1 in the past and when neither the first data nor the third data is stored in the working memory 16, the hands-free apparatus 1 according to the present embodiment unlocks the first data stored in the storage memory 17 and copies the first data from the storage memory 17 to the working memory 16. Therefore, with the hands-free apparatus 1 according to the present embodiment, data transferred from a plurality of mobile phones backed up in the storage memory 17 is used, so that already transferred phonebook data or the like need not to be transferred from the mobile phone 2 again.

Furthermore, when it is determined that the mobile phone 2 connected this time has never been connected to the hands-free apparatus 1 in the past, the hands-free apparatus 1 according to the present embodiment deletes the first data from the working memory 16 and does not delete the first data from the storage memory 17. Therefore, with the hands-free apparatus 1 according to the present embodiment, even though the number of newly connected mobile phones 2 increases, data transferred from mobile phones that were connected in the past can be held in the storage memory 17.

Furthermore, when it is determined that the mobile phone 2 connected this time has ever been connected to the hands-free apparatus 1 in the past, the hands-free apparatus 1 according to the present embodiment receives the second data that is data including at least one of the outgoing call history data, the incoming call history data, the missed call history data, and the phonebook data stored in the mobile phone 2 and is the difference from the first data stored in the working memory 16 or the storage memory 17, and stores the received second data in the working memory 16 and the storage memory 17. Therefore, with the hands-free apparatus 1 according to the present embodiment, when a mobile phone 2 that was connected in the past is connected again, a data transfer time can be reduced by updating only the difference without re-transferring data transferred in the past connection.

Fourth Embodiment

In the first and third embodiments described above, an example of the predetermined condition for locking the working memory 16 is that the Bluetooth communication is interrupted. In a fourth embodiment, the locking of the working memory 16 is controlled according to the reception level in the Bluetooth communication.

The hands-free apparatus 1 according to the present embodiment includes a control device 12, a Bluetooth communication unit 13, an operating unit 14, a display unit 15, a working memory 16, a storage memory 17, a microphone 18, and a speaker 19, as in the second embodiment.

As in the second embodiment, the hands-free apparatus 1 according to the present embodiment includes a reception unit 301, a hands-free call connection unit 302, a data transfer control unit 303, a determination unit 304, a lock control unit 305, a display control unit 306, and a notification unit 307. The hands-free call connection unit 302, the data transfer control unit 303, the determination unit 304, the display control unit 306, and the notification unit 307 have the same functions as in the second embodiment.

Figure 18:
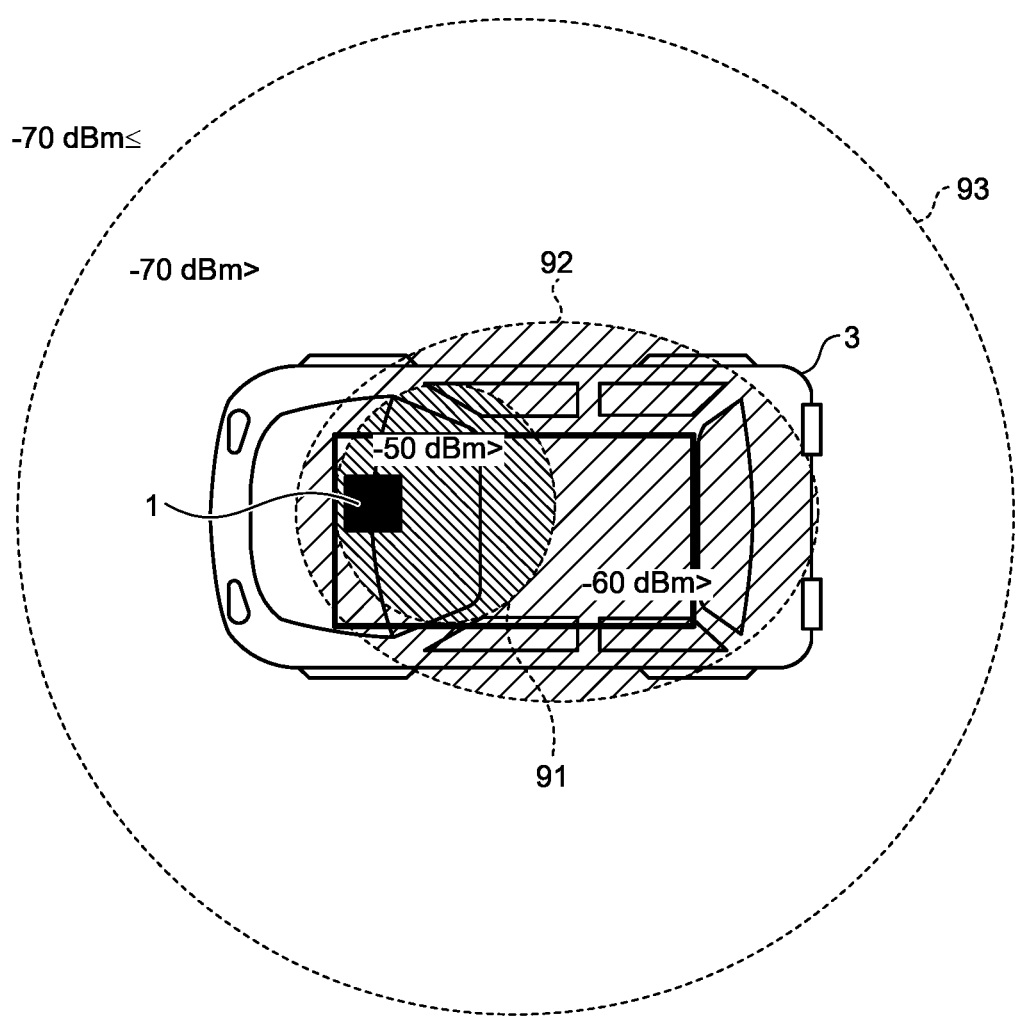
FIG. 18 is a diagram illustrating an example of the reception level in Bluetooth (registered trademark) communication according to a fourth embodiment.

FIG. 18 is a diagram illustrating an example of the reception level in the Bluetooth communication according to the fourth embodiment. The reception level in the Bluetooth communication is the strength of a Bluetooth signal received from the mobile phone 2 by the Bluetooth communication unit 13, and the unit thereof is dBm. Furthermore, the reception level in the Bluetooth communication is an example of the communication strength of wireless connection in the present embodiment.

The predetermined condition in the present embodiment includes that the reception level in the Bluetooth communication from the mobile phone 2 is equal to or less than a threshold. It is assumed that the threshold can be changed by a user.

For example, in the present embodiment, the reception unit 301 receives a user's operation of changing the threshold of the reception level in the Bluetooth communication that locks the working memory 16, with the functions in the second embodiment provided. For example, the user may select any one from a plurality of threshold options prepared in advance.

The lock control unit 305 according to the present embodiment locks the first data stored in the working memory 16 when the reception level in the Bluetooth communication from the mobile phone 2 is equal to or less than the threshold, with the functions in the second embodiment provided.

The timing at which the working memory 16 is locked differs depending on the magnitude of the threshold to be set.

As illustrated in FIG. 18, the hands-free apparatus 1 is provided, for example, in the vicinity of a dashboard of the vehicle 3. The closer the mobile phone 2 is to the hands-free apparatus 1, the stronger the reception level in Bluetooth communication.

A first area 91 illustrated in FIG. 18 is an area where the reception level in the Bluetooth communication is greater than −50 dBm. A second area 92 is an area where the reception level in the Bluetooth communication is equal to or less than −50 dBm and greater than −60 dBm. A third area 93 is an area where the reception level in the Bluetooth communication is equal to or less than −60 dBm and greater than −70 dBm. Furthermore, an area outside the third area 93 is an area where the reception level in the Bluetooth communication is equal to or less than −70 dBm. The numerical values of the threshold illustrated in FIG. 18 are examples and not limited thereto.

The first area 91 includes, for example, a driver's seat and a passenger seat. The second area 92 includes, for example, a rear seat. The third area 93 includes, for example, the periphery of the vehicle 3. The distance at which the working memory 16 is not locked changes depending on a threshold selected from −50 dBm, −60 dBm, and −70 dBm by a user.

For example, in a case where −50 dBm is selected as the threshold, the working memory 16 is locked when the mobile phone 2 leaves the first area 91. Therefore, for example, when a driver moves to the rear seat along with the mobile phone 2, the working memory 16 is locked. In a case where −60 dBm is selected as the threshold, the working memory 16 is locked when the mobile phone 2 leaves the second area 92. In such a case, even though the mobile phone 2 is placed in the rear seat, the working memory 16 is not be locked. In a case where −70 dBm is selected as the threshold, the working memory 16 is locked when the mobile phone 2 leaves the third area 93. In such a case, even though the driver gets off the vehicle 3 with the mobile phone 2, the working memory 16 is not be locked when the driver is around the vehicle 3.

FIG. 19 is a diagram illustrating an example of a flow of a data transfer process according to the fourth embodiment. A process of selecting a mobile phone with a higher priority at S301 to a process of determining whether the ACC power supply is in an OFF state at S314 are the same as those in the second embodiment described with reference to FIG. 14.

When the ACC power supply is in the ON state ("No" at S314), the lock control unit 305 according to the present embodiment determines whether the reception level in the Bluetooth communication between the mobile phone 2 and the hands-free apparatus 1 is equal to or less than the threshold (S501).

When it is determined that the reception level in the Bluetooth communication is equal to or less than the threshold ("Yes" at S501), the lock control unit 305 locks the working memory 16 (S316).

When it is determined that the reception level in the Bluetooth communication is greater than the threshold value ("No" at S501), the lock control unit 305 returns to the process of S313. The processes from S316 to S319 are the same as those in the second embodiment described with reference to FIG. 14.

In this way, with the hands-free apparatus 1 according to the present embodiment, when the reception level in the Bluetooth communication with the mobile phone 2 is equal to or less than the threshold, the working memory 16 is locked. Therefore, even when the connection between the mobile phone 2 and the hands-free apparatus 1 is not disconnected, data recorded in the working memory 16 can be protected according to changes in the distance between the mobile phone 2 and the hands-free apparatus 1.

Furthermore, according to the hands-free apparatus 1 according to the present embodiment, since the threshold can be changed by a user, the distance between the mobile phone 2 and the hands-free apparatus 1 at which the working memory 16 is locked can be adjusted according to a user's application or the like.

In the present embodiment, the threshold is selectable by a user, but may be set to a specified value at the time of shipment of the hands-free apparatus 1. Furthermore, the user may be able to select whether to enable the function of locking the working memory 16 according to the reception level in the Bluetooth communication.

First Modification

In each of the aforementioned embodiments, the first and second lock flags are exemplified as means for prohibiting access to, that is, reading, data such as the phonebook data stored in the working memory 16 and the storage memory 17; however, methods other than the first and second lock flags may be used. For example, access authority for each memory area in the working memory 16 and the storage memory 17 may be set in each application program, and the authority may be changed when the phonebook data or the like is locked.

Second Modification

Furthermore, in each of the aforementioned embodiments, in a case where the first data stored in the working memory 16 or the storage memory 17 has been locked, when the reception unit 301 receives a user's operation regarding access to the first data, it is notified that access to the first data is not possible; however, a configuration that makes no notification may be adopted.

For example, when the first data stored in the working memory 16 or the storage memory 17 has been locked, the hands-free apparatus 1 prohibits access to the first data based on a user's operation; however, the prohibition may not be clearly indicated to the user.

Third Modification

Furthermore, in the aforementioned third embodiment, an example in which the storage memory 17 stores therein identification information of a mobile phone that has ever been connected to the hands-free apparatus 1 in the past has been described; however, a configuration in which identification information of a plurality of mobile phones is registered in the hands-free apparatus 1 by a user regardless of the presence or absence of connection in the past may be adopted. In such a case, the lock control unit 305 determines whether identification information of the mobile phone 2 connected to the hands-free apparatus 1 matches identification information of a plurality of mobile phones pre-registered in the storage memory 17.

Fourth Modification

Furthermore, in each of the embodiments, an example in which the priorities of a plurality of mobile phones 2 to be communication connection targets of the hands-free apparatus 1 are pre-registered has been described; however, as described above, the HFP communication connection and the PBAP communication connection with unregistered mobile phones may be made.

When a plurality of mobile phones 2 are present within the Bluetooth connection range of the hands-free apparatus 1, the higher the reception level in the Bluetooth communication from the mobile phones, the higher the priority may be. In such a case, even after connection between the hands-free apparatus 1 and any of the mobile phones 2 is established, when a mobile phone 2 with the highest reception level is replaced due to a change in the positional relationship among the mobile phones 2 or the like, a mobile phone 2 to be preferentially connected to the hands-free apparatus 1 may be changed. Furthermore, the display control unit 306 may cause the display unit 15 to display identification information of the mobile phone 2 with the highest reception level in the Bluetooth communication, for example, a phone number or the like.

Other Embodiments

The present disclosure is not limited to the embodiments, and can be modified or extended as follows.

The hands-free apparatus 1 may include a hands-free dedicated apparatus that mainly implements a hands-free function, or may be an apparatus in which the hands-free function is provided to a CD or a vehicle audio device that plays a radio. Furthermore, the hands-free apparatus 1 may have a portable (portable type) configuration.

The present disclosure is not limited to a configuration in which the mobile phone 2 and the hands-free apparatus 1 perform Bluetooth communication, and may have a configuration in which the mobile phone 2 and the hands-free apparatus 1 perform another near-field wireless communication or wired communication.

The present disclosure may have a configuration in which the outgoing call history data, the incoming call history data, and the phonebook data received from the mobile phone 2 are stored in the storage memory 17, and whenever the outgoing call history data, the incoming call history data, or the phonebook data is received from the mobile phone 2, the outgoing call history data, the incoming call history data, and the phonebook data are updated and stored. Furthermore, the present disclosure may have a configuration in which the outgoing call history data, the incoming call history data, and the phonebook data received from the mobile phone 2 are stored in both the working memory 16 and the storage memory 17, and the storage memory 17 is used as a backup memory.

The number of pieces of outgoing call history data and the number of pieces of incoming call history data storable in the working memory 16 may be one. In such a case, when there is outgoing call processing or incoming call processing in the hands-free apparatus 1, the outgoing call history data or the incoming call history data received by the PBAP wireless communication connection is always erased.

Furthermore, in the hands-free apparatus 1, a plurality of pieces of outgoing call history data and a plurality of pieces of incoming call history are displayed simultaneously; however, they may also be displayed one by one. In such a case, for example, the latest data may be displayed first, and then the next latest data may be displayed in order by an operation of the operating unit 14.

The number of pieces of outgoing call history data and the number of pieces of incoming call history data storable in the working memory 16 may be one. In such a case, when there is outgoing call processing or incoming call processing in the hands-free apparatus 1, the outgoing call history data or the incoming call history data received by the PBAP wireless communication connection is always erased.

The present disclosure is not limited to a configuration in which when the mobile phone 2 and the hands-free apparatus 1 establish a Bluetooth channel, the outgoing call history data and the incoming call history data are automatically transferred, and may have a configuration in which the outgoing call history data, the incoming call history data, and the phonebook data are transferred on the condition that a user operates the hands-free apparatus 1 or the mobile phone 2.

The present disclosure is not limited to a configuration in which when the outgoing call history data, the incoming call history data, and the phonebook data received from mobile phones 2 are stored in the working memory 16 separately for each mobile phone 2, the mobile phone 2 and the data stored in the working memory 16 are associated with each other by a method of generating a link key, and may have a configuration in which both are associated with each other by other methods.

The computer program to be executed by the hands-free apparatus 1 of the aforementioned embodiments is provided by being incorporated in a ROM or the like in advance. The computer program to be executed by the hands-free apparatus 1 of the aforementioned embodiments may be configured to be provided as being recorded on a computer-readable recording medium, such as a CD-ROM, a flexible disk (FD), a CD-R, or a digital versatile disc (DVD), in an installable or executable file format.

Moreover, the computer program to be executed by the hands-free apparatus 1 of the aforementioned embodiments may be configured to be provided by being stored on a computer connected to a network such as the Internet and downloaded via the network. Furthermore, the computer program to be executed by the hands-free apparatus 1 of the aforementioned embodiments may be configured to be provided or distributed via the network such as the Internet.

Although some embodiments of the present invention have been described, these embodiments have been presented by way of example only, and are not intended to limit the scope of the invention. These embodiments can be implemented in a variety of other forms, and various omissions, substitutions, and changes can be made without departing from the spirit of the invention. These embodiments and modifications thereof are included in the invention described in the claims and the equivalent thereof as would fall within the scope and spirit of the invention.

Technology Proposals

The above embodiments can be summarized in the following technology proposals.

First Technology Proposal

A hands-free apparatus that enables a hands-free call by being wirelessly connected to a mobile phone that stores therein history data and phonebook data in which registered names are registered corresponding to phone numbers, the history data including incoming call history data representing an incoming call phone number that is a source of an incoming call and outgoing call history data representing an outgoing call phone number that is a destination of an outgoing call, the hands-free apparatus comprising: a control unit that performs control of connecting to the mobile phone by a transfer protocol for transferring the history data and the phonebook data; and a data reception unit that receives the history data and the phonebook data from the mobile phone by the transfer protocol when the mobile phone is present in a wireless connection area, wherein, when connection based on the transfer protocol with the mobile phone is disconnected during reception of at least one of the history data and the phonebook data, the control unit displays an error and causes a display unit to display a reconnection screen for receiving an instruction for reconnection based on the transfer protocol with the mobile phone from a user.

Second Technology Proposal

The hands-free apparatus according to the first technology proposal, wherein, when the instruction for reconnection is received from the user via the reconnection screen, the control unit performs reconnection based on the transfer protocol and receives the history data and the phonebook data by the transfer protocol, and when an interruption instruction is received from the user via the reconnection screen, the control unit interrupts reception of the history data and the phonebook data.

Third Technology Proposal

The hands-free apparatus according to the first or second technology proposal, wherein, when prohibition or restriction of transfer of the history data and the phonebook data is set in the mobile phone, the control unit causes the display unit to display information indicating that the transfer of the history data and the phonebook data is not possible, and the data reception unit does not receive the history data and the phonebook data from the mobile phone by the transfer protocol even though the mobile phone is present in the wireless connection area.

Fourth Technology Proposal

The hands-free apparatus according to the first or second technology proposal, wherein, when prohibition or restriction of transfer of the history data is set in the mobile phone, the control unit causes the display unit to display information indicating that the transfer of the history data is not possible, and the data reception unit does not receive the history data from the mobile phone by the transfer protocol even though the mobile phone is present in the wireless connection area.

Fifth Technology Proposal

The hands-free apparatus according to the first or second technology proposal, wherein, when prohibition or restriction of transfer of the phonebook data is set in the mobile phone, the control unit causes the display unit to display information indicating that the transfer of the phonebook data is not possible, and the data reception unit does not receive the phonebook data from the mobile phone by the transfer protocol even though the mobile phone is present in the wireless connection area.

Sixth Technology Proposal

The hands-free apparatus according to any one of the first to fifth technology proposals, wherein the history data further includes missed call history data representing a missed call phone number with which no response is made to an incoming call, and when the history data does not include all incoming and outgoing call history data in which the incoming call phone number, the outgoing call phone number, and the missed call phone number are integrated, the control unit generates the all incoming and outgoing call history data based on the incoming call phone number included in the received incoming call history data, the outgoing call phone number included in the received outgoing call phone number, and the missed call phone number included in the received missed call history data.

Seventh Technology Proposal

The hands-free apparatus according to the sixth technology proposal, wherein the control unit generates the all incoming and outgoing call history data in which the incoming call phone number included in the received incoming call history data, the outgoing call phone number included in the received outgoing call phone number, and the received missed call history data are sorted by date and time information.

Eighth Technology Proposal

The hands-free apparatus according to the sixth technology proposal, wherein the control unit generates the all incoming and outgoing call history data in which the incoming call phone number included in the received incoming call history data, the outgoing call phone number included in the received outgoing call phone number, and the received missed call history data are sorted according to a reception order.

Ninth Technology Proposal

The hands-free apparatus according to any one of the first to eighth technology proposals, wherein the transfer protocol is a phone book access profile (PBAP).

Tenth Technology Proposal

A hands-free system including a plurality of apparatuses that enable a hands-free call by being wirelessly connected to a mobile phone that stores therein history data and phonebook data in which registered names are registered corresponding to phone numbers, the history data including incoming call history data representing an incoming call phone number that is a source of an incoming call and outgoing call history data representing an outgoing call phone number that is a destination of an outgoing call, the hands-free system comprising: a control unit that performs control of connecting to the mobile phone by a transfer protocol for transferring the history data and the phonebook data; and a data reception unit that receives the history data and the phonebook data from the mobile phone by the transfer protocol when the mobile phone is present in a wireless connection area, wherein, when connection based on the transfer protocol with the mobile phone is disconnected during reception of at least one of the history data and the phonebook data, the control unit displays an error and causes a display unit to display a reconnection screen for receiving an instruction for reconnection based on the transfer protocol with the mobile phone from a user.

Eleventh Technology Proposal

A data transfer method performed in a hands-free apparatus that enables a hands-free call by being wirelessly connected to a mobile phone that stores therein history data and phonebook data in which registered names are registered corresponding to phone numbers, the history data including incoming call history data representing an incoming call phone number that is a source of an incoming call and outgoing call history data representing an outgoing call phone number that is a destination of an outgoing call, the hands-free apparatus comprising a control unit that performs control of connecting to the mobile phone by a transfer protocol for transferring the history data and the phonebook data and a data reception unit that receives the history data and the phonebook data from the mobile phone by the transfer protocol when the mobile phone is present in a wireless connection area, the data transfer method comprising: when connection based on the transfer protocol with the mobile phone is disconnected during reception of at least one of the history data and the phonebook data, displaying an error and causing a display unit to display a reconnection screen for receiving an instruction for reconnection based on the transfer protocol with the mobile phone from a user.

Twelfth Technology Proposal

A hands-free apparatus including a hands-free call connection unit connected to a mobile phone so that a hands-free call can be made, and a data transfer control unit that receives first data including at least one of the outgoing call history data, the incoming call history data, missed call history data, and phonebook data stored in the mobile phone, and stores the received first data in a first storage unit, and a lock control unit that locks the first data stored in the first storage unit when a predetermined condition is satisfied.

Thirteenth Technology Proposal

The hands-free apparatus according to the twelfth technology proposal, further including a determination unit that determines whether the mobile phone is a mobile phone identical to a previously connected mobile phone, wherein, when it is determined by the determination unit that the mobile phone is a mobile phone identical to the previously connected mobile phone, the lock control unit unlocks the first data stored in the first storage unit.

Fourteenth Technology Proposal

The hands-free apparatus according to the twelfth technology proposal, further including a determination unit that determines whether the hands-free apparatus was connected in the past to the mobile phone, wherein the data transfer control unit stores the first data in the first storage unit in association with identification information that is able to specify the mobile phone from which the first data is acquired, and when it is determined by the determination unit that the hands-free apparatus was connected in the past to the mobile phone and when the first data associated with the identification information of the mobile phone is stored in the first storage unit, the lock control unit unlocks the first data.

Fifteenth Technology Proposal

The hands-free apparatus according to the thirteenth or fourteenth technology proposal, wherein the first storage unit is nonvolatile, the data transfer control unit stores the first data in a second storage unit that is nonvolatile, and the lock control unit locks the first data stored in the second storage unit.

Sixteenth Technology Proposal

The hands-free apparatus according to the fifteenth technology proposal, wherein, when it is determined by the determination unit that the mobile phone is a mobile phone identical to a previously connected mobile phone and the first data is not stored in the first storage unit, the lock control unit unlocks the first data stored in the second storage unit and copies the first data from the second storage unit to the first storage unit.

Seventeenth Technology Proposal

The hands-free apparatus according to the fifteenth or sixteenth technology proposal, wherein, when it is determined by the determination unit that the mobile phone is not a mobile phone identical to the previously connected mobile phone, the lock control unit deletes the first data from the first storage unit and the second storage unit.

Eighteenth Technology Proposal

The hands-free apparatus according to any one of the fifteenth to seventeenth technology proposals, wherein, when it is determined by the determination unit that the mobile phone is a mobile phone identical to the previously connected mobile phone, the data transfer control unit receives second data that is data including at least one of the outgoing call history data, the incoming call history data, the missed call history data, and the phonebook data stored in the mobile phone and is a difference from the first data stored in the first storage unit or the second storage unit, and stores the received second data in the first storage unit and the second storage unit.

Nineteenth Technology Proposal

The hands-free apparatus according to the fifteenth technology proposal, wherein, when it is determined by the determination unit that the hands-free apparatus was connected in the past to the mobile phone and when third data associated with identification information of a mobile phone different from the mobile phone is stored in the first storage unit, the lock control unit deletes the third data, unlocks the first data stored in the second storage unit, and then copies the first data from the second storage unit to the first storage unit.

Twentieth Technology Proposal

The hands-free apparatus according to the nineteenth technology proposal, wherein, when it is determined by the determination unit that the hands-free apparatus was connected in the past to the mobile phone and when neither the first data nor the third data is stored in the first storage unit, the lock control unit unlocks the first data stored in the second storage unit and copies the first data from the second storage unit to the first storage unit.

Twenty-First Technology Proposal

The hands-free apparatus according to the fifteenth, nineteenth, or twentieth technology proposal, wherein, when it is determined by the determination unit that the hands-free apparatus was not connected in the past to the mobile phone, the lock control unit deletes the first data from the first storage unit and does not delete the first data from the second storage unit.

Twenty-Second Technology Proposal

The hands-free apparatus according to any one of the nineteenth to twenty-first technology proposals, wherein, when it is determined by the determination unit that the hands-free apparatus was connected in the past to the mobile phone, the data transfer control unit receives second data that is data including at least one of the outgoing call history data, the incoming call history data, the missed call history data, and the phonebook data stored in the mobile phone and is a difference from the first data stored in the first storage unit or the second storage unit, and stores the received second data in the first storage unit and the second storage unit.

Twenty-Third Technology Proposal

The hands-free apparatus according to any one of the twelfth to twenty-second technology proposals, wherein the predetermined condition includes that connection with the mobile phone is disconnected.

Twenty-Fourth Technology Proposal

The hands-free apparatus according to any one of the twelfth to twenty-third technology proposals, wherein the mobile phone and the hands-free apparatus are wirelessly connected, and the predetermined condition includes that the communication strength of the wireless connection from the mobile phone is equal to or less than a threshold.

Twenty-Fifth Technology Proposal

The hands-free apparatus according to the twenty-fourth technology proposal, wherein the threshold can be changed by a user.

Twenty-Sixth Technology Proposal

The hands-free apparatus according to any one of the twelfth to twenty-fifth technology proposals, further including a reception unit that receives an operation of a user, and a notification unit that notifies that access to the first data is not possible when the reception unit receives an operation of the user regarding the access to the first data in a case where the first data stored in the first storage unit has been locked.

Twenty-Seventh Technology Proposal

A method including a hands-free call connection step of connecting to a mobile phone so that a hands-free call can be made, a reception step of receiving first data including at least one of outgoing call history data, incoming call history data, missed call history data, and phonebook data stored in the mobile phone, a storage control step of storing the received first data in a first storage unit, and a lock control step of locking the first data stored in the first storage unit when a predetermined condition is satisfied.

Twenty-Eighth Technology Proposal

A computer program causing a computer to perform a hands-free call connection step of connecting to a mobile phone so that a hands-free call can be made, a reception step of receiving first data including at least one of outgoing call history data, incoming call history data, missed call history data, and phonebook data stored in the mobile phone, a storage control step of storing the received first data in a first storage unit, and a lock control step of locking the first data stored in the first storage unit when a predetermined condition is satisfied.

A hands-free apparatus according to the present disclosure can improve the convenience of users.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A hands-free apparatus that enables a hands-free call by being wirelessly connected to a mobile phone that stores therein history data and phonebook data in which a registered name is registered corresponding to a phone number, the history data including incoming call history data representing an incoming call phone number that is a source of an incoming call and outgoing call history data representing an outgoing call phone number that is a destination of an outgoing call, the hands-free apparatus comprising:
a memory; and
a hardware processor coupled to the memory,
the hardware processor being configured to:
perform control of connecting to the mobile phone by a transfer protocol for transferring the history data and the phonebook data;
receive the history data and the phonebook data from the mobile phone by the transfer protocol when the mobile phone is present in a wireless connection area;
display an error and display a reconnection screen for receiving an instruction for reconnection by the transfer protocol with the mobile phone from a user, on a display, when connection by the transfer protocol with the mobile phone is disconnected during reception of at least one of the history data and the phonebook data;
perform reconnection by the transfer protocol and receive the history data and the phonebook data by the transfer protocol when receiving the instruction for reconnection from the user via the reconnection screen; and
interrupt reception of the history data and the phonebook data when receiving an interruption instruction from the user via the reconnection screen.

2. The hands-free apparatus according to claim 1, wherein the hardware processor is configured to:
when prohibition or restriction of transfer of the history data and the phonebook data is set in the mobile phone, display information indicating that the transfer of the history data and the phonebook data is not possible on the display; and
not receive the history data and the phonebook data from the mobile phone by the transfer protocol even when the mobile phone is present in the wireless connection area.

3. The hands-free apparatus according to claim 1, wherein the hardware processor is configured to:
when prohibition or restriction of transfer of the history data is set in the mobile phone, display information indicating that the transfer of the history data is not possible on the display; and
not receive the history data from the mobile phone by the transfer protocol even when the mobile phone is present in the wireless connection area.

4. The hands-free apparatus according to claim 1, wherein the hardware processor is configured to:
when prohibition or restriction of transfer of the phonebook data is set in the mobile phone, display information indicating that the transfer of the phonebook data is not possible on the display, and
not receive the phonebook data from the mobile phone by the transfer protocol even when the mobile phone is present in the wireless connection area.

5. The hands-free apparatus according to claim 1, wherein
the history data further includes missed call history data representing a missed call phone number for which no response is made to an incoming call, and
the hardware processor is configured to generate all incoming and outgoing call history data in which the incoming call phone number, the outgoing call phone number, and the missed call phone number are integrated, based on the incoming call phone number included in the received incoming call history data, the outgoing call phone number included in the received outgoing call phone number, and the missed call phone number included in the received missed call history data, when the history data does not include the all incoming and outgoing call history data.

6. The hands-free apparatus according to claim 5, wherein the hardware processor is configured to generate the all incoming and outgoing call history data in which the incoming call phone number included in the received incoming call history data, the outgoing call phone number included in the received outgoing call phone number, and the received missed call history data are sorted by date and time information.

7. The hands-free apparatus according to claim 5, wherein the hardware processor is configured to generate the all incoming and outgoing call history data in which the incoming call phone number included in the received incoming call history data, the outgoing call phone number included in the received outgoing call phone number, and the received missed call history data are sorted according to a reception order.

8. The hands-free apparatus according to claim 1, wherein the transfer protocol is a phone book access profile (PBAP).

9. The hands-free apparatus according to claim 1, wherein the hardware processor is further configured to:
receive first data including at least one of the outgoing call history data, the incoming call history data, missed call history data, and the phonebook data stored in the mobile phone, and store the received first data in a first storage; and
lock the first data stored in the first storage when a predetermined condition is satisfied.

10. The hands-free apparatus according to claim 9, wherein the hardware processor is further configured to determine whether the mobile phone is identical to a previously connected mobile phone, and
the hardware processor is configured to unlock the first data stored in the first storage, when determining that the mobile phone is identical to the previously connected mobile phone.

11. The hands-free apparatus according to claim 10, wherein
the first storage is volatile, and
the hardware processor is configured to:
store the first data in a second storage that is nonvolatile; and
lock the first data stored in the second storage.

12. The hands-free apparatus according to claim 9, wherein the hardware processor is further configured to determine whether connection to the mobile phone has been made in a past, and
the hardware processor is configured to:
store the first data in the first storage in association with identification information that is able to specify the mobile phone from which the first data is acquired; and
unlock the first data when determining that the connection to the mobile phone has been made in the past and when the first data associated with the identification information of the mobile phone is stored in the first storage.

13. The hands-free apparatus according to claim 12, wherein
the first storage is volatile, and
the hardware processor is configured to:
store the first data in a second storage that is nonvolatile; and
lock the first data stored in the second storage.

14. A hands-free system including a plurality of apparatuses that enable a hands-free call by being wirelessly connected to a mobile phone that stores therein history data and phonebook data in which a registered name is registered corresponding to a phone number, the history data including incoming call history data representing an incoming call phone number that is a source of an incoming call and outgoing call history data representing an outgoing call phone number that is a destination of an outgoing call, the hands-free system comprising:
a memory; and
a hardware processor coupled to the memory,
the hardware processor being configured to:
perform control of connecting to the mobile phone by a transfer protocol for transferring the history data and the phonebook data;
receive the history data and the phonebook data from the mobile phone by the transfer protocol when the mobile phone is present in a wireless connection area;
display an error and display a reconnection screen for receiving an instruction for reconnection by the transfer protocol with the mobile phone from a user, on a display, when connection by the transfer protocol with the mobile phone is disconnected during reception of at least one of the history data and the phonebook data;
perform reconnection by the transfer protocol and receive the history data and the phonebook data by the transfer protocol when receiving the instruction for reconnection from the user via the reconnection screen; and
interrupt reception of the history data and the phonebook data when receiving an interruption instruction from the user via the reconnection screen.

15. A data transfer method performed in a hands-free apparatus that enables a hands-free call by being wirelessly connected to a mobile phone that stores therein history data and phonebook data in which a registered name is registered corresponding to a phone number, the history data including incoming call history data representing an incoming call phone number that is a source of an incoming call and outgoing call history data representing an outgoing call phone number that is a destination of an outgoing call, wherein
the hands-free apparatus comprises:
a memory; and
a hardware processor coupled to the memory,
the hardware processor is configured to:
perform control of connecting to the mobile phone by a transfer protocol for transferring the history data and the phonebook data; and
receive the history data and the phonebook data from the mobile phone by the transfer protocol when the mobile phone is present in a wireless connection area, and
the data transfer method comprises:
displaying an error and displaying a reconnection screen for receiving an instruction for reconnection by the transfer protocol with the mobile phone from a user on a display, when connection by the transfer protocol with the mobile phone is disconnected during reception of at least one of the history data and the phonebook data;
perform reconnection by the transfer protocol and receive the history data and the phonebook data by the transfer protocol when receiving the instruction for reconnection from the user via the reconnection screen; and
interrupt reception of the history data and the phonebook data when receiving an interruption instruction from the user via the reconnection screen.

* * * * *